US012801465B2

(12) United States Patent
Awai

(10) Patent No.: US 12,801,465 B2
(45) Date of Patent: Nov. 17, 2026

(54) INFORMATION PROCESSING DEVICE AND INFORMATION PROCESSING METHOD

(71) Applicant: SONY GROUP CORPORATION, Tokyo (JP)

(72) Inventor: Shoichi Awai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 869 days.

(21) Appl. No.: 18/004,956

(22) PCT Filed: Jun. 28, 2021

(86) PCT No.: PCT/JP2021/024350
§ 371 (c)(1),
(2) Date: Jan. 10, 2023

(87) PCT Pub. No.: WO2022/019061
PCT Pub. Date: Jan. 27, 2022

(65) Prior Publication Data
US 2023/0236906 A1 Jul. 27, 2023

(30) Foreign Application Priority Data
Jul. 20, 2020 (JP) ................................ 2020-124008

(51) Int. Cl.
*G06F 9/54* (2006.01)
*G06F 11/34* (2006.01)

(52) U.S. Cl.
CPC ............ *G06F 9/54* (2013.01); *G06F 11/3495* (2013.01)

(58) Field of Classification Search
CPC .......... G06F 9/54; G06F 11/3495; G06F 9/30; G06F 9/545; G06F 12/0891; G06F 21/52; G06F 21/556; G06F 21/62
See application file for complete search history.

(56) References Cited

U.S. PATENT DOCUMENTS 9,348,999 B2 * 5/2016 Sugaya .................... G06F 21/52
2003/0149895 A1 * 8/2003 Choo .................... H04L 63/105
713/167

(Continued)

FOREIGN PATENT DOCUMENTS

JP 2002-182931 A 6/2002
WO 2019/167360 A1 9/2019

OTHER PUBLICATIONS

International Search Report and Written Opinion of PCT Application No. PCT/JP2021/024350, issued on Sep. 21, 2021, 08 pages of ISRWO.

*Primary Examiner* — Peng Ke
(74) *Attorney, Agent, or Firm* — CHIP LAW GROUP

(57) ABSTRACT

Provided are an information processing device and an information processing method that execute system call processing with improved processing efficiency without compromising security level. A kernel as a data processor that carries out system call execution control determines reliability of an application that executes system call invocation and reliability of processing data, and selects and executes either a safety-oriented system call A or a throughput-oriented system call B in according to a result of the determination. With the safety-oriented system call A, confirmation of permission to execute a system call and cache flush are executed, but with the throughput-oriented system call B, the confirmation of permission to execute a system call and the cache flush are skipped.

14 Claims, 15 Drawing Sheets

(56) References Cited

U.S. PATENT DOCUMENTS

| | | | | |
|---|---|---|---|---|
| 2005/0050363 | A1* | 3/2005 | Naka | G06F 21/62 726/4 |
| 2005/0076237 | A1* | 4/2005 | Cohen | G06F 21/554 726/4 |
| 2006/0101408 | A1* | 5/2006 | Kotamarthi | G06F 21/52 726/21 |
| 2016/0026409 | A1* | 1/2016 | Tanaka | G06F 12/0891 711/120 |
| 2017/0097886 | A1* | 4/2017 | Banerjee | G06F 12/126 |
| 2018/0081591 | A1* | 3/2018 | Maheshwari | G06F 12/1045 |
| 2018/0253268 | A1* | 9/2018 | Tonegawa | G06F 3/1238 |
| 2020/0159580 | A1* | 5/2020 | Makineedi | G06F 21/552 |

* cited by examiner

FIG. 1A APPLICATION LAYER

FIG. 1B OS (KERNEL) LAYER

FIG. 1C HW LAYER

FIG. 2

| SYSTEM CALL NUMBER n (1 TO N) | VECTOR TABLE (INSTRUCTION ADDRESS ASSOCIATED WITH SYSTEM CALL NUMBER n) | REMARKS: SYSTEM CALL TYPE |
|---|---|---|
| 1 | 0x00001000 | FILE OPEN |
| 2 | 0x00002000 | FILE READ |
| 3 | 0x00003000 | FILE WRITE |
| 4 | 0x00004000 | FILE CLOSE |
| ... | ... | ... |
| N | ... | ... |

FIG. 6

| SYSTEM CALL NUMBER n (1 TO N) | VECTOR TABLE (INSTRUCTION ADDRESS ASSOCIATED WITH SYSTEM CALL NUMBER) | | | | REMARKS: SYSTEM CALL TYPE |
|---|---|---|---|---|---|
| | VECTOR TABLE A (INSTRUCTION ADDRESS A) | | VECTOR TABLE B (INSTRUCTION ADDRESS B) | | |
| 1 | (1A) | 0x00001000 | (1B) | 0x00011000 | FILE OPEN |
| 2 | (2A) | 0x00002000 | (2B) | 0x00012000 | FILE READ |
| 3 | (3A) | 0x00003000 | (3B) | 0x00013000 | FILE WRITE |
| 4 | (4A) | 0x00004000 | (4B) | 0x00014000 | FILE CLOSE |
| ... | .. | ... | .. | ... | ... |
| N | .. | ... | .. | ... | ... |

FIG. 7

| | DETERMINATION PARAMETER | IN A CASE WHERE SAFETY-ORIENTED SYSTEM CALL A (VECTOR TABLE A) IS SELECTED | IN A CASE WHERE THROUGHPUT-ORIENTED SYSTEM CALL B (VECTOR TABLE B) IS SELECTED |
|---|---|---|---|
| (1) | USER PERMISSION AT TIME OF PROGRAM EXECUTION | GENERAL USER OTHER THAN SYSTEM (OTHER THAN root USER FOR UNIX/Linux) | SYSTEM (root USER FOR UNIX/Linux) |
| (2) | PROGRAM STORAGE LOCATION | SOFTWARE ADDED LATER IN PLUG-IN MANNER OR THE LIKE | SOFTWARE PREINSTALLED ON SYSTEM FROM BEGINNING |
| (3) | CONFIRM PROGRAM SIGNATURE CODE | SOFTWARE OF WHICH SOFTWARE DEVELOPER HAS NOT PROVEN RELIABLE | SOFTWARE OF WHICH SOFTWARE DEVELOPER HAS PROVEN RELIABLE |
| (4) | DOMAIN NAME OR IP ADDRESS OF COMMUNICATION DESTINATION IN A CASE OF PROGRAM THAT CARRIES OUT NETWORK COMMUNICATIONS | IN A CASE WHERE COMMUNICATION PARTNER HAS NOT PROVEN RELIABLE IN PRESET PARTNER CONFIRMATION OR THE LIKE | IN A CASE WHERE COMMUNICATION PARTNER HAS PROVEN RELIABLE IN PRESET PARTNER CONFIRMATION OR THE LIKE |
| (5) | FILE ACCESS PATH | LEAD TO SPECIFIC SYSTEM AREA | LEAD TO GENERAL AREA OTHER THAN SPECIFIC SYSTEM AREA |
| (6) | RESOURCE (CPU, MEMORY, DISK I/O, OR THE LIKE) USED BY PROCESS OR PROCESS GROUP | IN A CASE WHERE RESOURCE USAGE IS GREATER THAN OR EQUAL TO CERTAIN VALUE OR IS LESS THAN OR EQUAL TO CERTAIN VALUE | IN A CASE WHERE RESOURCE USAGE IS GREATER THAN OR EQUAL TO CERTAIN VALUE OR IS LESS THAN OR EQUAL TO CERTAIN VALUE |
| (7) | SYSTEM STATE | · PROCESSING LOAD ON CPU IS GREATER THAN OR EQUAL TO CERTAIN VALUE OR IS LESS THAN OR EQUAL TO CERTAIN VALUE<br>· TEMPERATURE OF SYSTEM IS GREATER THAN OR EQUAL TO CERTAIN VALUE OR IS LESS THAN OR EQUAL TO CERTAIN VALUE<br>· POWER SUPPLY CAPACITY OF SYSTEM IS GREATER THAN OR EQUAL TO CERTAIN VALUE OR IS LESS THAN OR EQUAL TO CERTAIN VALUE | · PROCESSING LOAD ON CPU IS GREATER THAN OR EQUAL TO CERTAIN VALUE OR IS LESS THAN OR EQUAL TO CERTAIN VALUE<br>· TEMPERATURE OF SYSTEM IS GREATER THAN OR EQUAL TO CERTAIN VALUE OR IS LESS THAN OR EQUAL TO CERTAIN VALUE<br>· POWER SUPPLY CAPACITY OF SYSTEM IS GREATER THAN OR EQUAL TO CERTAIN VALUE OR IS LESS THAN OR EQUAL TO CERTAIN VALUE |
| (8) | CUMULATIVE NUMBER OF TIMES OF EXECUTION OF PROGRAM | IN A CASE WHERE CUMULATIVE NUMBER OF TIMES IS LESS THAN OR EQUAL TO CERTAIN VALUE | IN A CASE WHERE CUMULATIVE NUMBER OF TIMES IS GREATER THAN OR EQUAL TO CERTAIN VALUE |
| (9) | PROGRAM EXECUTION TIMING | EXECUTION TIMING FALLS WITHIN TIMING PERIOD GENERATED FROM RANDOM NUMBER | IN A CASE WHERE EXECUTION TIMING FALLS OUTSIDE TIMING PERIOD GENERATED FROM RANDOM NUMBER |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/024350 filed on Jun. 28, 2021, which claims priority benefit of Japanese Patent Application No. JP 2020-124008 filed in the Japan Patent Office on Jul. 20, 2020. Each of the above-referenced applications is hereby incorporated herein by reference in its entirety.

TECHNICAL FIELD

The present disclosure relates to an information processing device, an information processing method, and a program. More specifically, the present disclosure relates to an information processing device, an information processing method, and a program that implement security measures taken at the time of data processing by a processor and improve data processing efficiency.

BACKGROUND ART

A processor such as a central processing unit (CPU) is used for data processing in an information processing device. The CPU executes various types of processing in accordance with a program stored in, for example, a read only memory (ROM) or a storage unit.

The architecture of the modern CPU often uses, in order to improve computation performance, a technique such as processing of temporarily storing processing data into a "cache memory", or a flexible processing sequence construction technique such as "speculative execution" or "out-of-order execution".

The "cache memory" is a high-speed memory used by a CPU to obscure a delay or a low bandwidth of a main memory, a bus, or the like when fetching or updating information such as data or an instruction and eliminate a difference in throughput between a processing device and a storage device.

Note that a technique using a cache memory in data processing by a CPU is described in, for example, Patent Document 1 (WO 2019/167360 A).

The "speculative execution" is processing of, in a case where there is a dependency between a preceding instruction and a subsequent instruction of a CPU, the subsequent instruction cannot be executed until a result of the preceding instruction is obtained, and acceleration using a pipeline cannot be made, temporarily ignoring the dependency, predicting a subsequent instruction that is likely to be executed, and advancing the stage of the subsequent instruction without waiting for the preceding instruction to complete.

In a case where the prediction is true, and the speculation succeeds, the stage proceed as it is. In a case where the prediction is wrong, and the speculation fails, it is called that a hazard (accident) has occurred in the pipeline, and the stage is reconstructed (restored) in order to "negate the speculation", and then the stage is resumed. The stage reconstruction, however, takes extra time. This is called penalty. In many architecture designs, various measures are taken to lower the hazard occurrence probability.

The "out-of-order execution" is one of the techniques for increasing the instructions per clock (IPC) of the CPU to increase throughput. The "out-of-order execution" is a technique by which a plurality of input instructions is reordered, and an instruction that has become ready for processing is input into the pipeline and then executed.

However, in recent years, it has been found that there is security vulnerability in the "speculative execution" and the "out-of-order execution", and execution of processing using a cache memory may bring about a case where a process can access a memory area provided for another process or a kernel even with the memory area configured to block access from the process.

Such vulnerability gives rise to a concern that data that needs to be kept secret is leaked to the outside.

CITATION LIST

Patent Document

Patent Document 1: WO 2019/167360 A

SUMMARY OF THE INVENTION

Problems to be Solved by the Invention

The present disclosure has been made in view of the above-described problems, for example, and it is therefore an object of the present disclosure to provide an information processing device, an information processing method, and a program that implement security measures taken at the time of data processing by a processor such as a CPU and improve data processing efficiency.

Solutions to Problems

An information processing device according to a first aspect of the present disclosure includes a data processor configured to carry out system call execution control in response to system call invocation that is a request to execute hardware application processing from an application, in which the data processor selects and executes one of a plurality of system calls associated with one system call number designated with the system call invocation.

Moreover, an information processing method according to a second aspect of the present disclosure is an information processing method that is executed by an information processing device, the information processing device including a data processor configured to carry out system call execution control in response to system call invocation that is a request to execute hardware application processing from an application, the information processing method including causing the data processor to select and execute one of a plurality of system calls associated with one system call number designated with the system call invocation.

Moreover, a program according to a third aspect of the present disclosure is a program for causing an information processing device to execute information processing, the information processing device including a data processor configured to carry out system call execution control in response to system call invocation that is a request to execute hardware application processing from an application, the program including causing the data processor to select and execute one of a plurality of system calls associated with one system call number designated with the system call invocation.

Note that the program of the present disclosure is, for example, a program that can be provided to an information processing device or a computer system capable of executing various program codes via a storage medium or a communication medium in a computer-readable format. Providing such a program in a computer-readable format allows the information processing device or the computer system to execute processing in accordance with the program.

Still other objects, features, and advantages of the present disclosure will become apparent from more detailed description based on the embodiments of the present disclosure described later and the accompanying drawings. Note that, herein, a system refers to a configuration of a logical set of a plurality of devices, and is not limited to a system in which devices as components are in the same housing.

According to a configuration of an embodiment of the present disclosure, an information processing device and an information processing method that execute system call processing with improved processing efficiency without compromising security level are provided.

Specifically, for example, a kernel as a data processor that carries out system call execution control determines the reliability of an application that executes the system call invocation and the reliability of processing data, and selects and executes either a safety-oriented system call A or a throughput-oriented system call B in accordance with a result of the determination. With the safety-oriented system call A, confirmation of permission to execute the system call and cache flush are executed, but with the throughput-oriented system call B, neither the confirmation of permission to execute the system call nor the cache flush is executed.

According to this configuration, an information processing device and an information processing method that execute system call processing with improved processing efficiency without compromising security level are provided.

Note that the effects described herein are merely examples and should not be restrictively interpreted, and additional effects may be provided.

BRIEF DESCRIPTION OF DRAWINGS

FIG. 2 is a diagram illustrating examples of a system call number and a vector table associated with the system call number.

FIG. 6 is a diagram illustrating examples of a system call number and a vector table associated with the system call number of the information processing device of the present disclosure.

FIG. 7 is a diagram for describing parameters regarding an application (program) to be referred to when an OS (kernel) of the information processing device of the present disclosure selects one of system calls A, B (vector tables A, B) and a specific example of processing of selecting one of the system calls A, B (vector tables A, B) on the basis of the parameters.

MODE FOR CARRYING OUT THE INVENTION

Figure 1:
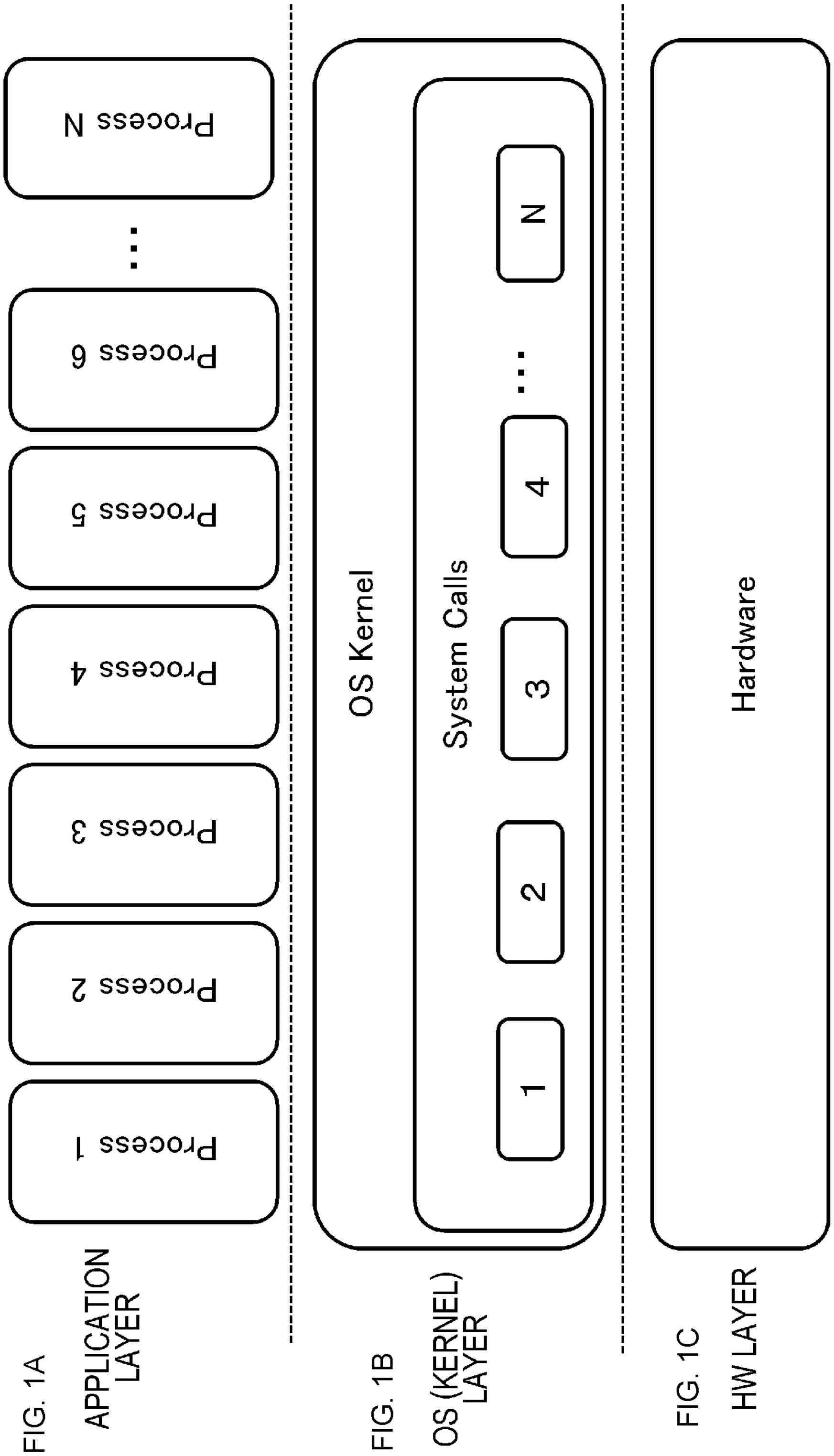
FIGS. 1A, 1B, and 1C are diagrams for describing a configuration example of a software stack of an information processing device.

Hereinafter, an information processing device, an information processing method, and a program of the present disclosure will be described in detail with reference to the drawings. Note that the description will be given according to the following items.

1. Technique for accelerating data processing using processor
2. Outline of data processing using system call
3. Configuration example of information processing device of present disclosure
4. Processing associated with system call executed by information processing device of present disclosure
5. Processing sequence executed by information processing device of present disclosure
6. Other embodiments and application examples
7. Configuration example of information processing device
8. Summary of configuration of present disclosure

1. TECHNIQUE FOR ACCELERATING DATA PROCESSING USING PROCESSOR

First, a technique for accelerating data processing using a processor will be described.

As described above, in order to accelerate data processing using a processor such as a central processing unit (CPU), a "cache memory", or a processing technique such as "speculative execution" or "out-of-order execution" that is a technique for configuring a processing sequence is used.

The "cache memory" is a high-speed memory used by a CPU to obscure a delay or a low bandwidth of a main memory, a bus, or the like when fetching or updating information such as data or an instruction and eliminate a difference in throughput between a processing device and a storage device.

The "speculative execution" is processing of, in a case where there is a dependency between a preceding instruction and a subsequent instruction of a CPU, the subsequent instruction cannot be executed until a result of the preceding instruction is obtained, and acceleration using a pipeline cannot be made, temporarily ignoring the dependency, predicting a subsequent instruction that is likely to be executed, and advancing the stage of the subsequent instruction without waiting for the preceding instruction to complete.

The "out-of-order execution" is one of the techniques for increasing the instructions per clock (IPC) of the CPU to increase throughput. The "out-of-order execution" is a technique by which a plurality of input instructions is reordered, and an instruction that has become ready for processing is input into the pipeline and then executed.

On the other hand, examples of data processing using a processor such as a CPU in an information processing device include data processing using unencrypted raw data. In a case where the unencrypted data is high confidential data, a memory storing the data and a data processing execution unit need to be set in an inaccessible area to which external access is blocked.

Specifically, for example, a kernel of an OS, the kernel being a core of an architecture that makes use of the capability of the CPU, is one of the inaccessible areas.

The kernel executes, for example, processing of allocating various types of hardware (resources) such as a CPU, a memory, and a communication unit of a hardware (HW) layer to a process to be executed by an application (program) that executes various data processing in an application layer, or a function as a task scheduler that determines an execution sequence of each process or the like.

A system memory also has an inaccessible area that is carefully isolated so as to block access from the other processes. In general, data in such an inaccessible area is highly confidential, and a strong protection wall is provided so as to block access from the other processes.

It has been found, however, that execution based on the above-described "speculative execution" or "out-of-order execution" that is a technique for accelerating data processing in the information processing device increases a possibility of data leakage and gives rise to security vulnerability.

Specifically, it has been found that execution of data processing using a cache memory may bring about a case where a certain process accesses a memory area provided for another process or a kernel to read confidential data even with the memory area configured to block access from the certain process.

As a representative technique of unauthorized access to confidential data in such an inaccessible area, the following two techniques are known and are each given a code name described below:

(1) Code name=Spectre (2) Code name=Meltdown.

An outline of these two unauthorized access techniques will be described.

(1) Code Name=Spectre

Unauthorized access by this technique is executed in accordance with the following procedure.

(S01) In a speculative execution stage of a certain process, information that should not be read is caused to be loaded into the cache memory of the CPU.

(S02) Another process can read, by referring to the cached information, the information that should not be read.

(2) Code Name=Meltdown.

Unauthorized access by this technique is executed in accordance with the following procedure.

(S01) Processing of accessing an area where access is prohibited after a certain period of time, such as repetitive processing that takes a certain period of time, is written in a data processing program.

(S02) Processing of leaving an access log in the cache of the CPU after processing in which exception handling is predicted to run is written in the program.

(S03) When an access prohibited area is accessed, an exception occurs, and processing is interrupted.

(S04) The out-of-order execution causes the processing of (S02) to be executed before the occurrence of the exception.

(S05) Reading the cache of the CPU at the time of the processing of (S04) makes it possible to determine where the information to which access is prohibited is located in a physical memory and refer to the information.

As described above, the two techniques are known as representative techniques of unauthorized access to confidential data in an inaccessible area.

The nature of the security vulnerability exploited by the above-described two techniques is that applying "speculative execution" or "out-of-order execution" used as a technique for accelerating data processing by the CPU allows another process, that is, a process prohibited to access data that is read from the memory area configured to block access from the process and is left in the cache memory, to be executed.

The vulnerability is inherent in the CPU basic architecture, so that it is difficult to solve this problem fundamentally. A temporary measure such as processing of flushing the cache memory when the kernel switches between processes or threads to erase data left in the cache memory or providing a memory barrier that prevents various processes from accessing the cache memory has been taken.

The cache, however, is a basic mechanism for accelerating an operation, so that flushing the cache memory to erase data left in the cache memory even in a temporary manner yields an adverse effect of leading to a large reduction in operation speed of the CPU.

2. OUTLINE OF DATA PROCESSING USING SYSTEM CALL

Next, an outline of data processing using a system call will be described.

An application (program) that executes various types of processing in the information processing device executes processing using hardware of the information processing device such as a CPU, a memory, or a communication unit. Many of such hardware components are under the control of an OS (kernel).

The application (program) that runs on the OS needs to use hardware (resource) such as the CPU, the memory, or the communication unit managed by the OS (kernel) for execution.

The OS (kernel) calls a function for enabling the application to use hardware such as the CPU. Such a function call or the function itself is referred to as a system call.

Specifically, the system call is, for example, processing of outputting an instruction or a function (for example, an instruction or a function for providing a function to a process (task) or allowing process (task) to use the function) by the OS (kernel). When the application invokes the system call, and the OS (kernel) executes the system call accordingly, the application can use hardware (resource) such as the CPU or the memory necessary for executing the application via the OS (kernel).

FIGS. 1A, 1B, and 1C illustrate a software configuration (software stack) of an information processing device having an application (program) that runs on an OS.

The software configuration (software stack) illustrated in FIGS. 1A, 1B, and 1C include the following layers:

FIG. 1A Application layer

FIG. 1B OS (kernel) layer

FIG. 1C Hardware (HW) layer.

The application layer is a layer including, for example, an application (program) that executes various types of processing, that is, a plurality of processes (tasks), in accordance with a program stored in a ROM or a storage unit.

Note that a process that is executed by the application on the application layer includes various processes such as a process of converting high confidential data into encrypted data and executing processing on the encrypted data, a process of executing processing on high confidential data as unencrypted data (raw data), and a process of executing processing on low confidential data.

The process further includes a large number of different processes of various types in terms of processing time, such as a real-time process that guarantees a processing completion deadline or a processing start time and other non real-time processes.

Many of such processes are executed using the CPU (core) of the hardware (HW) layer.

Note that the example illustrated in FIGS. 1A, 1B, and 1C are configuration of a multi-core CPU device including a plurality of CPUs (cores) in the hardware (HW) layer.

The OS (kernel) layer has a function as a task scheduler that assigns a process (task) to any CPU (core) of the hardware (HW) layer and determines an execution sequence of each process or the like. The task scheduler executes process management processing such as processing of setting a queue in which processes are queued in an execution order, processing of assigning a process to each CPU (core) constituting the multi-core CPU, or processing of moving a process (task) between cores.

Note that processing adapted to the OS (kernel) layer is executed, as a matter of fact, as a kernel thread by a CPU (core) of the multi-core CPU of the hardware (HW) layer.

In the kernel thread, processing that is adapted to the kernel, the kernel being software serving as a core of the operating system (OS), and includes task scheduling processing as management processing such as processing of assigning a process (task) to each CPU (core) constituting the multi-core CPU and processing of moving a process between cores is executed.

The processing further includes processing of managing resources and memories necessary for execution of a task by each core, and processing such as a process switch.

FIGS. 1A, 1B, and 1C illustrate a plurality of system calls (1, 2, 3, 4, . . . N) in the OS (kernel) layer.

As described above, the application (program) that runs on the OS (kernel) uses hardware (resource) such as the CPU, the memory, or the communication unit under the management of the OS (kernel) for execution.

The OS (kernel) execute the system call invocation as processing of calling a function for enabling the application to use hardware such as the CPU.

The application executes the system call invocation processing using, for example, an interrupt processing or a dedicated instruction.

As described above, the system call often uses a special instruction, and, for example, the CPU transitions from a user level at which normal data processing by the application is executed to a privilege level at which resource control by the OS (kernel) is executed in response to the special instruction, and controls resources to be used by the application.

Although a specific method is system-dependent, a transition to a high privilege level is made by throwing an exception or an interrupt, or the transition to a high privilege level is made using a special branch instruction. At this time, a number or an argument indicating a type of a system call is stored in a register or a call stack, and a high privilege-level code (kernel) uses the number or the argument to execute processing.

In either case, a "system call number" is used to identify which system call has been requested. Then, an instruction address indicating an actual processing program associated with the system call number is stored as a "vector table" in a specific location. That is, only the system call number serves as an identifier, and the instruction address indicating the actual processing code is subordinate to the system call number.

FIG. 2 illustrates examples of a system call number and a vector table associated with the system call number.

As illustrated in FIG. 2, a vector table is associated with each system call number (1 to N) (an instruction address associated with each system call number).

FIG. 2 further illustrates a "system call type" indicating processing of a specific type associated with each system call number (1 to N).

For example, in a case where an application wants to execute processing of opening a file stored in a storage unit in hardware, that is, (file open), the application executes the system call invocation with the system call number 1 designated for the OS (kernel).

Each vector table illustrated in FIG. 2 is, for example, a unique vector table stored in the information processing device, and all processes or threads that are executable entities in the processes executed in the information processing device execute processing using the same vector table.

In the related art, a set of instruction addresses each associated with a corresponding one of various system calls is static called a vector table, so that only unique system calls are available for all processes and threads.

In general, the system call is executed by a high privilege-level code in the kernel, the confirmation of permission to execute the system call and the check of an argument parameter are strictly made before the start of processing. In a case where it is determined that the execute permission is disabled or the argument parameter is an invalid value on the basis of a result of the check, the system call is not executed, and an error is returned.

Furthermore, in order to avoid a vulnerability problem such as the above-described Spectre or Meltdown, measures are taken to clear the cache memory in response to a switch between processes or threads so as to prevent a process or a thread from accessing a memory provided for another process or thread beyond the permission.

Figure 3:
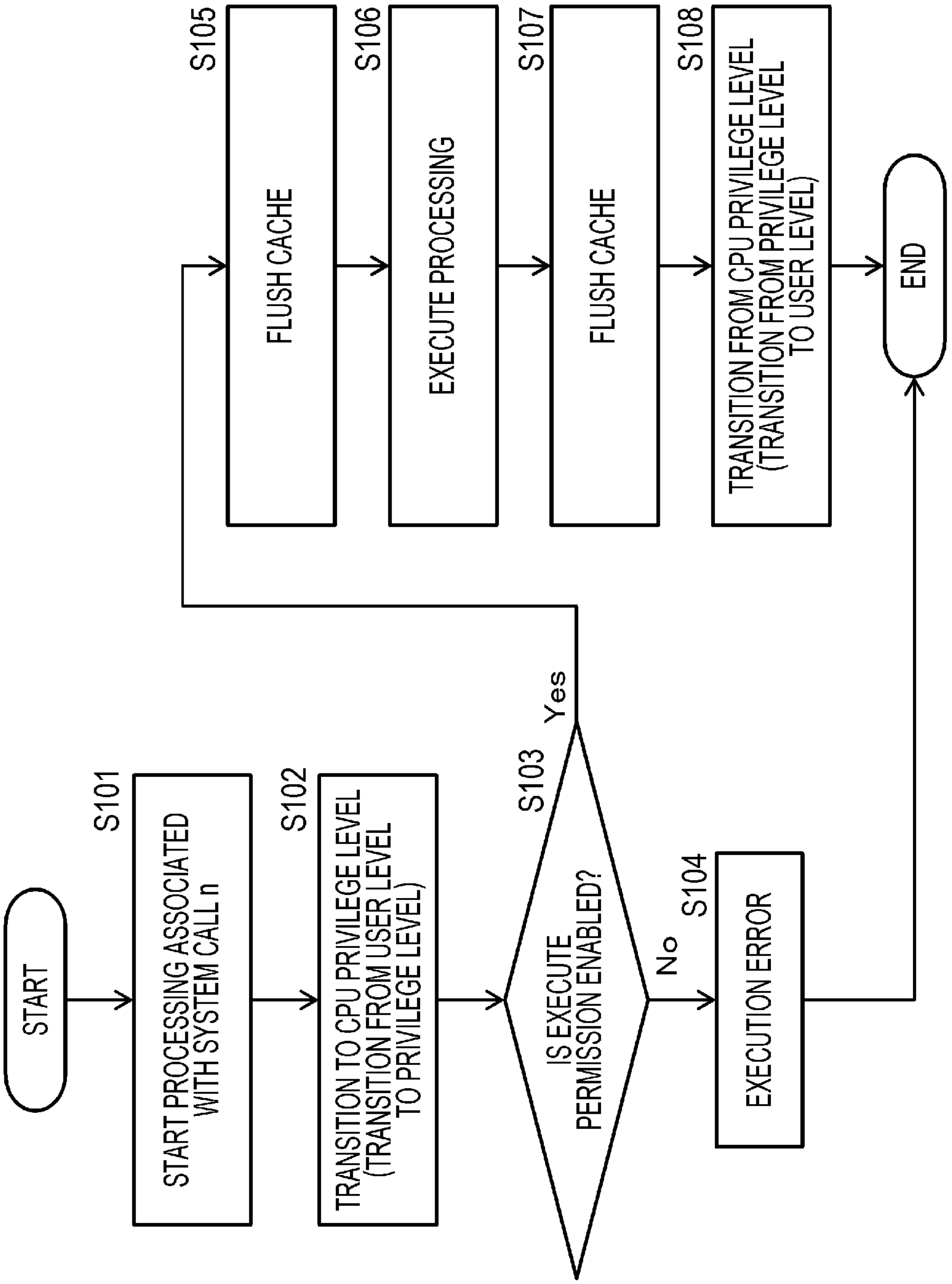
FIG. 3 is a diagram illustrating a flowchart for describing a processing sequence in a case where one system call (system call n) is invoked in the information processing device.

FIG. 3 is a diagram illustrating a flowchart for describing a processing sequence in a case where one system call (system call n) is invoked in the information processing device.

Hereinafter, processing of each step of the flowchart illustrated in FIG. 3 will be sequentially described.

(Step S101)

First, the application executes the system call invocation with the system call n that is one of the system call numbers designated.

This system call invocation is executed using, for example, an interrupt processing or a dedicated instruction.

(Step S102)

Next, in step S102, processing of transitioning to the CPU privilege level is executed in response to the system call invocation processing. As described above, the CPU transitions, in response to the system call invocation processing, from the user level at which normal data processing by the application is executed to the privilege level at which resource control by the OS (kernel) is executed.

(Step S103)

Next, in step S103, the OS (kernel) confirms permission to execute the system call. Processing in accordance with the system call, that is, processing such as access to hardware, is executed by a high privilege-level code in the kernel, so that the confirmation of permission to execute the system call and the check of an argument parameter are strictly made before the start of the processing.

In a case where it is determined that the execute permission is disabled, or the argument parameter is an invalid value on the basis of a result of the check, the determination in step S103 indicates No, and the processing proceeds to step S104.

On the other hand, in the processing of confirming execute permission in step S103, in a case where it is determined that the execute permission is enabled, and the argument parameter is a correct value, the determination in step S103 indicates Yes, and the processing proceeds to step S105.

(Step S104)

In the confirmation of permission to execute the system call and the check of an argument parameter in step S103, in a case where it is determined that the execute permission is disabled, or the argument parameter is an invalid value, the determination in step S103 indicates No, and the processing proceeds to step S104.

In this case, step S104 results in an execution error. That is, the processing in accordance with the system call is not executed, and the processing is terminated.

(Step S105)

On the other hand, in the confirmation of permission to execute the system call and the check of an argument parameter in step S103, in a case where it is determined that the execute permission is enabled, and the argument parameter is a correct value, the determination in step S103 indicates Yes, and the processing proceeds to step S105.

In this case, in step S105, the cache is flushed first. That is, cache flush processing is executed to erase data left in the cache memory, the cache memory being used for the processing in accordance with the system call, such as file open processing, file read processing, or file write processing.

(Step S106)

Next, processing in accordance with the system call, such as file open processing, file read processing, or file write processing, is executed using the cache after being subjected to the cache flush processing.

(Step S107)

When the processing in accordance with the system call, such as file open processing, file read processing, or file write processing, is completed in step S106, the cache flush processing is executed again in step S107 on the cache used for the processing.

This processing erases data recorded in the cache, and it is therefore possible to prevent unauthorized processing such as reading of data from the cache by another subsequent process or data leakage.

(Step S108)

Finally, in step S108, processing of transitioning from the CPU privilege level to the user level is executed. This level transition causes a transition to the user level at which normal data processing is executed by the application.

In the processing according to the flow illustrated in FIG. 3, the cache flush processing executed in step S105 and step S107 corresponds to processing for preventing data loaded into the cache from being read in an unauthorized manner by and leaked to another process that is executed before or after the processing.

That is, in order to prevent confidential data from being read in an unauthorized manner using the representative techniques of unauthorized access to confidential data in an inaccessible area described above, that is, (1) Code name=Spectre, and (2) Code name=Meltdown, the cache flush processing in step S105 and step S107 of the flow illustrated in FIG. 3 is an effective countermeasure.

Such cache flush processing, however, gives rise to a problem of a decrease in throughput of data processing.

An information processing device of the present disclosure to be described below is configured to solve this problem.

That is, it is possible to avoid security vulnerability without a decrease in throughput of data processing.

3. CONFIGURATION EXAMPLE OF INFORMATION PROCESSING DEVICE OF PRESENT DISCLOSURE

Next, a configuration example of the information processing device of the present disclosure will be described.

The information processing device of the present disclosure is configured to solve the above-described problem and makes it possible to accelerate data processing by a processor such as a CPU without compromising security level.

Specifically, a configuration is implemented where processing such as "speculative execution" or "out-of-order execution" that is a technique for accelerating data processing described above is executed in a secure manner without causing the leakage of confidential data.

A configuration example of the information processing device of the present disclosure will be described.

Figure 4:
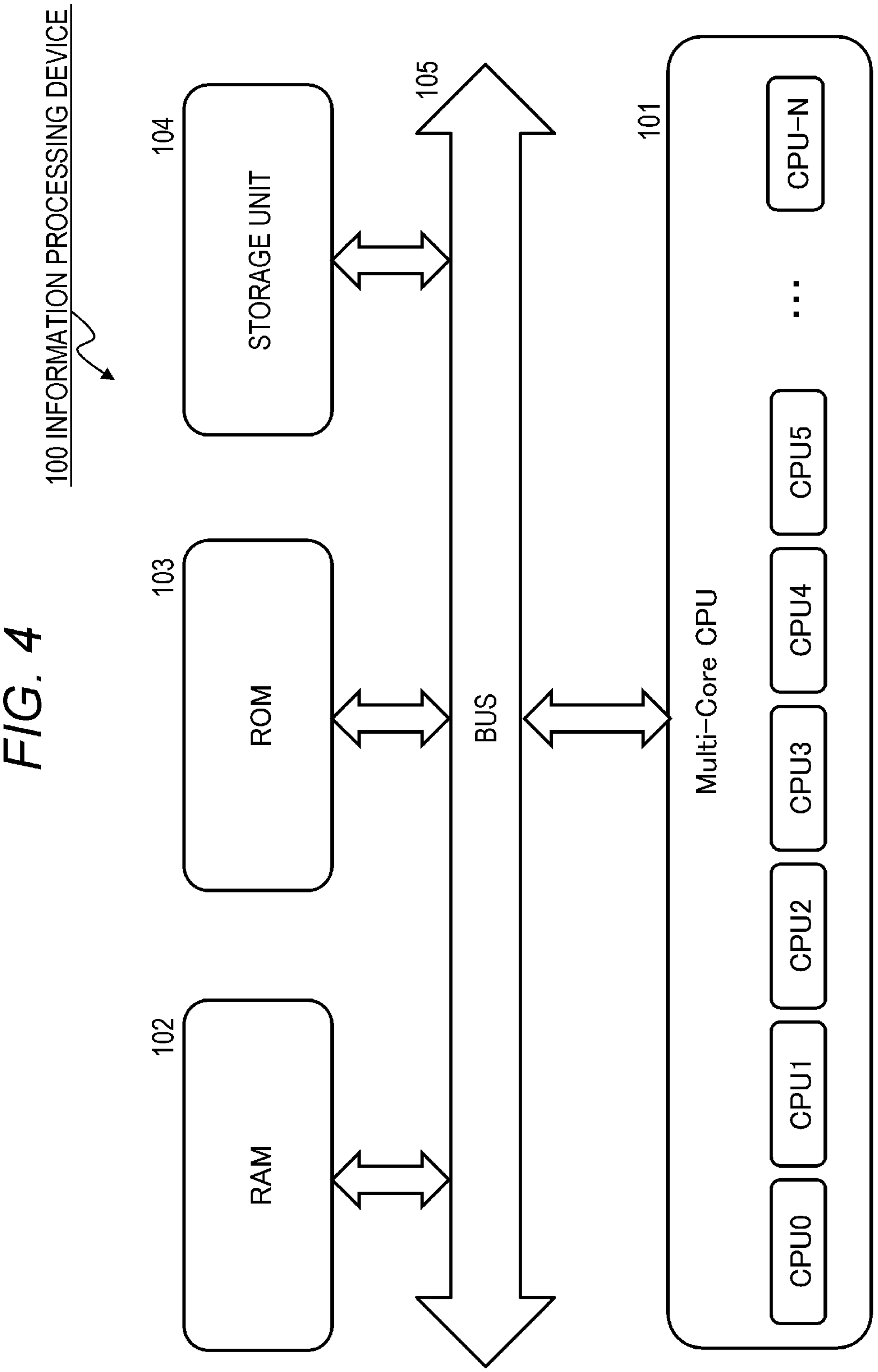
FIG. 4 is a diagram for describing a configuration example of an information processing device of the present disclosure.

FIG. 4 is a diagram illustrating a configuration example of an information processing device 100 of the present disclosure.

As illustrated in FIG. 4, a configuration according to an embodiment of the information processing device 100 of the present disclosure includes a multi-core CPU 101.

The multi-core CPU 101 includes at least two cores (CPUs) as hardware. That is, the multi-core CPU 101 includes a plurality of CPUs, and the CPUs are capable of executing their respective processing (processes (tasks)) in parallel.

Note that the information processing device 100 of the present disclosure need not necessarily include such a multi-core CPU 101 including a plurality of CPUs, and the information processing device 100 having a configuration with a single CPU is also applicable to a configuration where different processes are executed in time series in units of threads.

The configuration illustrated in FIG. 4 is a configuration example of the information processing device of the present disclosure.

The information processing device 100 illustrated in FIG. 4 includes a random access memory (RAM) 102, a read only memory (ROM) 103, and a storage unit 104 in addition to the multi-core CPU 101, and has a configuration where such components are connected over a bus 105.

The read only memory (ROM) 103 is used as a storage area of a program of a process or a thread that is executed by the multi-core CPU 101, a parameter required for the execution of the process or the thread, and the like.

The random access memory (RAM) 102 is used as a work area, a parameter storage area, a recording area of other data, and the like used for processing that is executed by the multi-core CPU 101.

The storage unit 104 is, for example, a storage device such as a hard disk, a CD, a DVD, or a flash memory, and records the storage area of the program of the process or the thread that is executed by the multi-core CPU 101, processing result data of the process or the thread that is executed by the multi-core CPU 101, and the like.

On the multi-core CPU 101, for example, various types of processing are executed in accordance with the program stored in the read only memory (ROM) 103 or the storage unit 104.

As illustrated in FIG. 4, the multi-core CPU 101 includes at least two cores (CPU) as hardware.

Next, a configuration of software (software stack) that is executed by a core (CPU) that is hardware in the multi-core CPU 101 of the information processing device 100 of the present disclosure will be described with reference to FIGS. 5A, 5B, and 5C.

Figures 5A, 5B, 5C:
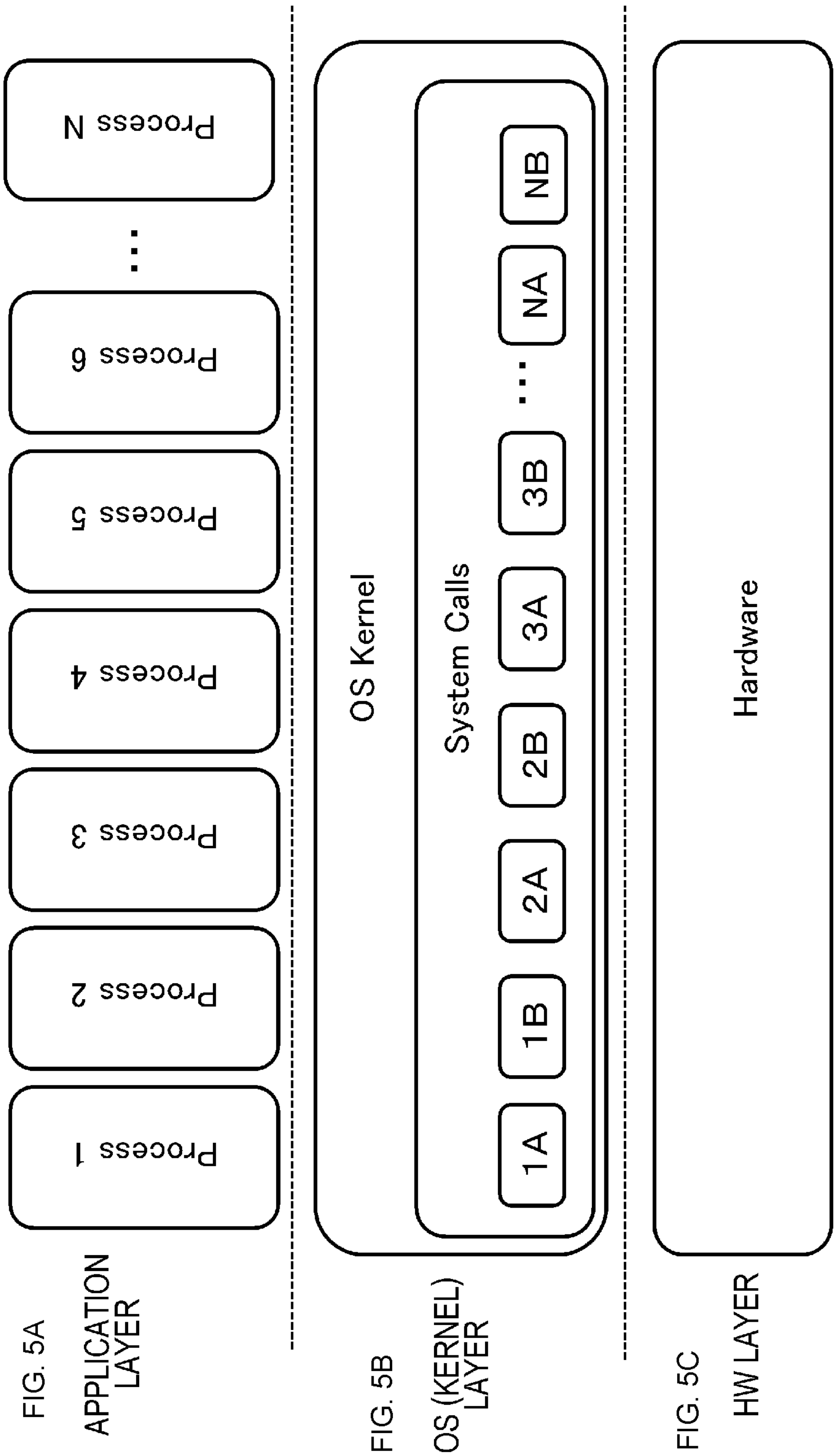
FIGS. 5A, 5B, and 5C are diagrams for describing a configuration example of a software stack of the information processing device of the present disclosure.

As illustrated in FIGS. 5A, 5B, and 5C, the software stack of the information processing device 100 of the present disclosure includes the following layers.

FIG. 5A Application layer

FIG. 5B OS (kernel) layer

FIG. 5C Hardware (HW) layer.

The basic configuration of such layers is similar to the layer configuration of the software stack of the general information processing device described above with reference to FIGS. 1A, 1B, and 1C.

The application layer is a layer including, for example, an application (program) that executes various types of processing, that is, processes, in accordance with the program stored in, for example, the ROM 103 or the storage unit 104.

Note that a process that is executed by the application on the application layer includes various processes such as a process of converting high confidential data into encrypted data and executing processing on the encrypted data, a process of executing processing on high confidential data as unencrypted data (raw data), and a process of executing processing on low confidential data.

The process further includes a large number of different processes of various types in terms of processing time, such as a real-time process that guarantees a processing completion deadline or a processing start time and other non real-time processes.

Such processes are executed using each CPU (core) in the multi-core CPU 101 of the hardware (HW) layer.

The OS (kernel) layer executes processing of allocating various types of hardware (resources) such as a CPU, a memory, and a communication unit of the hardware (HW) layer to a process that is executed by the application (program) that executes various types of data processing in the application layer.

The OS (kernel) layer has, for example, a function as a task scheduler that assigns a process (task) to each CPU (core) of the multi-core CPU 101 of the hardware (HW) layer and determines an execution sequence of each process or the like. The task scheduler executes process (task) management processing such as processing of setting a queue in which processes (tasks) are queued in an execution order, processing of assigning a process to each CPU (core) constituting the multi-core CPU 101, and processing of moving a process (task) between cores.

Note that processing adapted to the OS (kernel) layer is executed, as a matter of fact, as a kernel thread by a CPU (core) of the multi-core CPU 101 of the hardware (HW) layer.

In the kernel thread, processing that is adapted to the kernel, the kernel being software serving as a core of the operating system (OS), and includes task scheduling processing as management processing such as processing of assigning a process (task) to each CPU (core) constituting the multi-core CPU 101 and processing of moving a process (task) between cores is executed.

The processing further includes processing of managing resources and memories necessary for execution of a task by each core, and processing such as a process (task) switch.

FIGS. 5A, 5B, and 5C illustrate a plurality of system calls (1A, 1B, 2A, 2B, 3A, 3B, . . . . NA, NB) in the OS (kernel) layer.

First, N system calls (1, 2, 3, 4, . . . . N) are illustrated in the OS (kernel) layer in the configuration described above with reference to FIGS. 1A, 1B, and 1C, but 2N system calls (1A, 1B, 2A, 2B, 3A, 3B, . . . . NA, NB) that are twice in number the N system calls illustrated in FIGS. 1A, 1B, and 1C are set in the OS (kernel) layer of the information processing device of the present disclosure.

The information processing device of the present disclosure has two different system calls A, B for each system call number (1, 2, . . . N).

Specifically, the system call A is a system call associated with a vector table A (instruction address A), and executes an instruction (processing) fetched via the vector table A (instruction address A).

On the other hand, the system call B is a system call associated with a vector table B (instruction address B), and executes an instruction (processing) fetched via the vector table B (instruction address B).

As described above, the OS (kernel) layer of the information processing device of the present disclosure includes two types of system calls associated with the two types of vector tables A, B (two instruction addresses A, B associated with each system call number).

That is, the two different system calls A, B are provided for each system call number (1, 2, . . . N), and in a case where the application executes the system call invocation with a certain system call number n designated, one system call is selected from two system calls, a system call nA and a system call nB, associated with the system call number n, and the system call thus selected is executed.

4. PROCESSING ASSOCIATED WITH SYSTEM CALL EXECUTED BY INFORMATION PROCESSING DEVICE OF PRESENT DISCLOSURE

Next, processing associated with a system call executed by the information processing device of the present disclosure will be described.

As described with reference to FIGS. 5A, 5B, and 5C, the information processing device of the present disclosure has two different system calls A, B for each system call number (1, 2, . . . . N).

The system call A executes an instruction (processing) fetched via the vector table A (instruction address A).

The system call B executes an instruction (processing) fetched via the vector table B (instruction address B).

That is, the configuration includes two types of vector tables A, B (two instruction addresses A, B associated with each system call number).

FIG. 6 illustrates examples of a system call number and a vector table associated with the system call number in the information processing device of the present disclosure.

As illustrated in FIG. 6, two vector tables A, B (two instruction addresses A, B) are associated with each system call number (1 to N).

Note that, as in FIGS. 1A, 1B, and 1C described above, FIG. 6 further illustrates "system call type" indicating processing of a specific type associated with each system call number (1 to N).

For example, in a case where the application wants to execute processing of opening a file stored in the storage unit in hardware, that is, (file open), the application executes the system call invocation with the system call number 1 designated for the OS (kernel).

In the related art, as described above with reference to FIGS. 1A, 1B, and 1C, one vector table, that is, one instruction address, is associated with each system call number (1 to N).

Therefore, processing that is executed in a case where a certain system call n is invoked is processing uniquely determined by one instruction address defined in one vector table. That is, for example, the processing according to the flow illustrated in FIG. 3 described above is executed.

On the other hand, in the information processing device of the present disclosure, as illustrated in FIG. 6, two system calls A, B are associated with each system call number (1 to N).

The system call A is associated with the vector table A (instruction address A), and the system call B is associated with the vector table B (instruction address B).

That is, two different vector tables A, B (instruction addresses A, B) are associated with each system call number (1 to N).

In a case where the application execute the system call invocation with one system call number n (n=1 to N) designated, the OS (kernel) of the information processing device of the present disclosure selects and executes one of the two vector tables associated with the system call n, that is, one of the two instruction addresses.

As processing that is executed in accordance with the two vector tables associated with the certain system call number n, that is, the two instruction addresses, basically the same processing, that is, processing associated with the system call number, is executed.

For example, in a case where the application wants to execute processing of opening a file stored in the storage unit in hardware, that is, (file open), the application executes the system call invocation with the system call number 1 designated for the OS (kernel).

The OS (kernel) selects one of the two system calls A, B (vector tables A, B) to execute corresponding processing in response to the system call invocation with the system call number 1 designated. Even in a case where any one of the two system calls A, B (vector tables A, B) is selected, basically the same processing, that is, file open processing, is executed.

File open processing in a case where the system call A (vector table A) is selected and file open processing in a case where the system call B (vector table B) is selected, however, are different in processing sequence from each other.

Processing in a case where the system call A (vector table A) is selected is executed as safety-oriented processing.

On the other hand, processing in a case where the system call B (vector table B) is selected is executed as throughput-oriented processing.

The safety-oriented processing that is executed when the system call A (vector table A) is selected is almost the same as the sequence described above with reference to FIG. 3, and the step of the processing of confirming permission to execute the system call (step S103 of the flow illustrated in FIG. 3) and the cache flush processing before and after the step of executing processing in accordance with the system call (step S106 of the flow illustrated in FIG. 3) are executed.

On the other hand, the throughput-oriented processing that is executed when the system call B (vector table B) is selected is different from the sequence described above with reference to FIG. 3. In this case, the step of the processing of confirming permission to execute the system call (step S103 of the flow illustrated in FIG. 3) and the cache flush processing before and after the step of executing processing in accordance with the system call (step S106 of the flow illustrated in FIG. 3) are skipped.

In the throughput-oriented processing that is executed when the system call B (vector table B) is selected, the processing of confirming permission to execute the system call and the cache flush processing are skipped, so that a time required until the end of data processing in accordance with the system call is shortened. That is, processing throughput increases.

As described above, the OS (kernel) selects one of the two system calls A, B (vector tables A, B) to execute corresponding processing in response to the system call invocation with a certain system call number designated.

For example, in a case where the OS (kernel) verifies the reliability of a process to be run at the time of system call execution and the reliability of data and determines that the reliability is low, or the data to be used for processing is high in confidentiality, the OS (kernel) selects and executes the system call A (vector table A) that is safety-oriented processing.

On the other hand, in a case where it is determined that the process to be run and the data are high in reliability, or in a case where the data to be used for processing is low in confidentiality, the system call B (vector table B) that is throughput-oriented processing is selected and executed.

Executing such processing allows high-speed operation of the CPU while taking security measures.

That is, for example, in a case where the application executes the system call invocation with one system call number n designated, the OS (kernel) selects and executes, on the basis of, for example, the reliability of a process to be run, the reliability of data, and the confidentiality of data, any one of:

(a) the system call nA (vector table nA) that is safety-oriented processing, or (b) the system call nB (vector table nB) that is throughput-oriented processing.

Note that the number of actual system calls for one system call is not limited to two, A and B, and may be three or more. There may be a plurality of system calls A, B, C, . . . with a balance between safety and throughput taken into consideration.

An example where the following two types of system calls:

(a) the system call nA (vector table nA) that is safety-oriented processing; and (b) the system call nB (vector table nB) that is throughput-oriented processing, are set for one system call number n will be described below.

The OS (kernel) selects one of the two system calls A, B (vector tables A, B) in accordance with the following selection criteria, for example.

(Criterion 1) A safety-oriented system call A (vector table A) is selected in response the system call invocation executed by an application (program) added later to the system or by a program provided by a third party.

(Criterion 2) A throughput-oriented system call B (vector table B) is selected in a case where, for example, a process to be executed by an application (program) is a code incorporated in the system and can be determined to be high enough in reliability.

The above is an example of selection criteria based on a developer or a provider of a program, but selection processing based on an attribute of data handled by an application (program) other than such criteria is also possible, for example. For example, in a case of an in-vehicle system, it is also possible to execute processing of selecting the safety-oriented system call A (vector table A) or the throughput-oriented system call B (vector table B) on the basis of the reliability of the other party for surrounding environment recognition, computation of travel plan, and the like based on input information (self-vehicle sensor information, information obtained through vehicle-to-vehicle communications, and information obtained from reliable central server).

Note that, in a case where the application (program) executes the system call invocation with a certain system call number n (n=1 to N) designated, the OS (kernel) executes processing of determining which one of the two system calls A, B (vector tables A, B) is selected and executed in response to the system call invocation.

The OS (kernel) refers to various parameters regarding the application (program) that has executed the system call invocation, and executes processing of selecting one of the system calls A, B (vector tables A, B) to be executed.

With reference to FIG. 7, the parameters regarding the application (program) to be referred to when the OS (kernel) selects one of the system calls A, B (vector tables A, B) and a specific example of processing of selecting one of the system calls A, B (vector tables A, B) on the basis of the parameters will be described.

As the parameters regarding the application (program) to be referred to when the OS (kernel) determines which of the safety-oriented system call A (vector table A) and the throughput-oriented system call B (vector table B) is applied, the following parameters illustrated in FIG. 7 are defined:

(1) User permission at the time of program execution (2) Program storage location (3) Program signature code (4) Domain name or IP address of communication destination in a case of program that carries out network communications (5) File access path (6) Resource (CPU, memory, disk I/O, or the like) used by process or process group (7) System state (8) Cumulative number of times of execution of program (9) Program execution timing Hereinafter, a specific processing example where the OS (kernel) determines which of the safety-oriented system call A (vector table A) and the throughput-oriented system call B (vector table B) is applied on the basis of each parameter will be described.

Determination Parameter=(1) User Permission at the Time of Program Execution

The OS (kernel) confirms the user permission at the time of execution of an application program that is an execution entity of the system call invocation.

In a case where the user permission indicates a general user other than the system (other than a root user for UNIX (registered trademark)/Linux (registered trademark)), the safety-oriented system call A (vector table A) is selected and executed.

On the other hand, in a case where the user permission indicates the system (the root user for UNIX (registered trademark)/Linux (registered trademark)), the throughput-oriented system call B (vector table B) is selected and executed.

Determination Parameter=(2) Program Storage Location

The OS (kernel) confirms the storage location of the application program that is an execution entity of the system call invocation.

In a case where the application program is determined to be software added later in a plug-in manner or the like on the basis of the storage location, the safety-oriented system call A (vector table A) is selected and executed.

On the other hand, in a case where the application program is software preinstalled on the system from the beginning, the throughput-oriented system call B (vector table B) is selected and executed.

Determination Parameter=(3) Program Signature Code

The OS (kernel) confirms a signature code of the developer (software developer) of the application program that is an execution entity of the system call invocation.

In a case where the application program is determined, on the basis of the confirmation of the signature code, to be software for which the developer (software developer) of the application program has not proven reliable, the safety-oriented system call A (vector table A) is selected and executed.

On the other hand, in a case where the application program is determined to be software for which the developer (software developer) of the application program has proven reliable, the throughput-oriented system call B (vector table B) is selected and executed.

Determination Parameter=(4) Domain Name or IP Address of Communication Destination in a Case of Program that Carries Out Network Communications The OS (kernel) confirms a domain name or IP address of a communication destination in a case where the application program that is an execution entity of the system call invocation is a program that carries out network communications.

In a case where the communication partner is confirmed to be a communication partner that has not proven reliable in preset partner confirmation or the like, the safety-oriented system call A (vector table A) is selected and executed.

On the other hand, in a case where the communication partner is confirmed to be a communication partner that has proven reliable in the preset partner confirmation or the like, the throughput-oriented system call B (vector table B) is selected and executed.

Determination Parameter=(5) File Access Path

The OS (kernel) confirms a file access path used by the application program that is an execution entity of the system call invocation.

In a case where the file access path leads to a specific system area defined in advance, the safety-oriented system call A (vector table A) is selected and executed.

On the other hand, in a case where the file access path leads to a general area other than the specific system area defined in advance, the throughput-oriented system call B (vector table B) is selected and executed.

Determination Parameter=(6) Resource (CPU, Memory, Disk I/O, or the Like) Used by Process or Process Group The OS (kernel) confirms a resource (CPU, memory, disk I/O, or the like) used by a process or a process group executed by the application program that is an execution entity of the system call invocation.

The OS (kernel) selects and executes either the safety-oriented system call A (vector table A) or the throughput-oriented system call B (vector table B) on the basis of a result of the resource usage confirmation.

This selection processing differs in a manner that depends on a use case.

For example, in a case where the resource usage is less than or equal to a certain value, the safety-oriented system call A (vector table A) for flushing the cache or the like can still be executed. On the other hand, in a case where the usage resource is greater than or equal to the certain value, the throughput-oriented system call B (vector table B) is executed because there is no margin.

Note that, in this case, there is a possibility that the above-described determination gives rise to vulnerability in a case where a program that intentionally occupies the system resource is running, so that a reverse determination is made, and processing in accordance with a use case such as the execution of the throughput-oriented system call B (vector table B) in a case where the usage resource is less than or equal to the certain value or the execution of the safety-oriented system call A (vector table A) in a case where the usage resource is greater than or equal to the certain value.

Determination Parameter=(7) System State

The OS (kernel) confirms a system state when the system call invocation is executed.

Specifically,

- whether a processing load on the CPU is greater than or equal to a certain value or is less than or equal to the certain value,
- a temperature of the system is greater than or equal to a certain value or is less than or equal to the certain value, and
- a power supply capacity (remaining battery capacity) of the system is greater than or equal to a certain value or is less than or equal to the certain value is confirmed.

The OS (kernel) selects and executes either the safety-oriented system call A (vector table A) or the throughput-oriented system call B (vector table B) on the basis of a result of the system state confirmation.

The selection processing in this case differs in a manner that depends on a use case, as in a case of the determination parameter=(6) Resource (CPU, memory, disk I/O, or the like) used by process or process group.

Determination Parameter=(8) Cumulative Number of Times of Execution of Program

The OS (kernel) confirms the cumulative number of times of execution of the application program that is an execution entity of the system call invocation.

In a case where the cumulative number of times is less than or equal to a certain value, the safety-oriented system call A (vector table A) is selected and executed.

On the other hand, in a case where the cumulative number of times is greater than or equal to the certain value, the throughput-oriented system call B (vector table B) is selected and executed.

This is because, on the basis of the fact that the program whose cumulative number of times of execution is greater than or equal to the certain value has been running without any problem, the program can be determined to be high in safety. In this case, the throughput-oriented system call B (vector table B) is selected and executed.

Determination Parameter=(9) Program Execution Timing

The OS (kernel) confirms execution timing of the application program that is the execution entity of the system call invocation.

In a case where the execution timing falls within a timing period generated from a random number, the safety-oriented system call A (vector table A) is selected and executed.

On the other hand, in a case where the execution timing falls outside the timing period generated from the random number, the throughput-oriented system call B (vector table B) is selected and executed.

The selection processing using the determination parameter=(9) program execution timing is executed as determination processing complementary to the selection processing based on the above-described determination parameter=(8) cumulative number of times of execution of program.

When a determination is made only on the basis of the determination parameter=(8) cumulative number of times of execution of program, safety cannot be ensured in a case where sophisticated switching is carried out such that the program itself conceals the execution of a malicious code and determines whether or not to execute the malicious code on the basis of the number of times. Therefore, the execution determination is made on the system side on the basis of the timing based on the random number.

As described above with reference to FIG. 7, the OS (kernel) executes the processing of selecting a system call (vector table) to be executed with reference to various parameters regarding the application (program) that has executed the system call invocation.

As described above, the information processing device of the present disclosure has a configuration where two system calls (vector tables) for one system call number, that is, the following two types of system calls (a), (b):

(a) safety-oriented system call A (vector table A); and
(b) throughput-oriented system call B (vector table B), can be selectively executed.

A data processor of the information processing device of the present disclosure, that is, the OS (kernel), is configured to selectively execute, on the basis of the reliability of the application program that executes the system call invocation, the reliability or confidentiality of data used for data processing in accordance with the system call, the condition of the system (information processing device), or the like, either one of the following two types of system calls (a), (b):

(a) safety-oriented system call A (vector table A); and
(b) throughput-oriented system call B (vector table B).

For example, in a case where the reliability of the application program that executes the system call invocation or the reliability of data used for processing is low, or in a case where the confidentiality of data used for processing is high, "(a) safety-oriented system call A (vector table A)" is selected and executed.

On the other hand, in a case where the reliability of the application program that executes the system call invocation or the reliability or confidentiality of data used for processing is high, or in a case where the confidentiality of data used for processing is low, "(b) throughput-oriented system call B (vector table B)" is selected and executed.

Note that, although details will be described later, in a case where "(b) throughput-oriented system call B (vector table B)" is executed, high-speed processing becomes possible, and processing efficiency can be increased accordingly.

5. PROCESSING SEQUENCE EXECUTED BY INFORMATION PROCESSING DEVICE OF PRESENT DISCLOSURE

Next, a processing sequence executed by the information processing device of the present disclosure will be described.

The processing sequence executed by the disclosed information processing device will be described with reference to flowcharts illustrated in FIG. 8 and the subsequent drawings.

Figure 8:
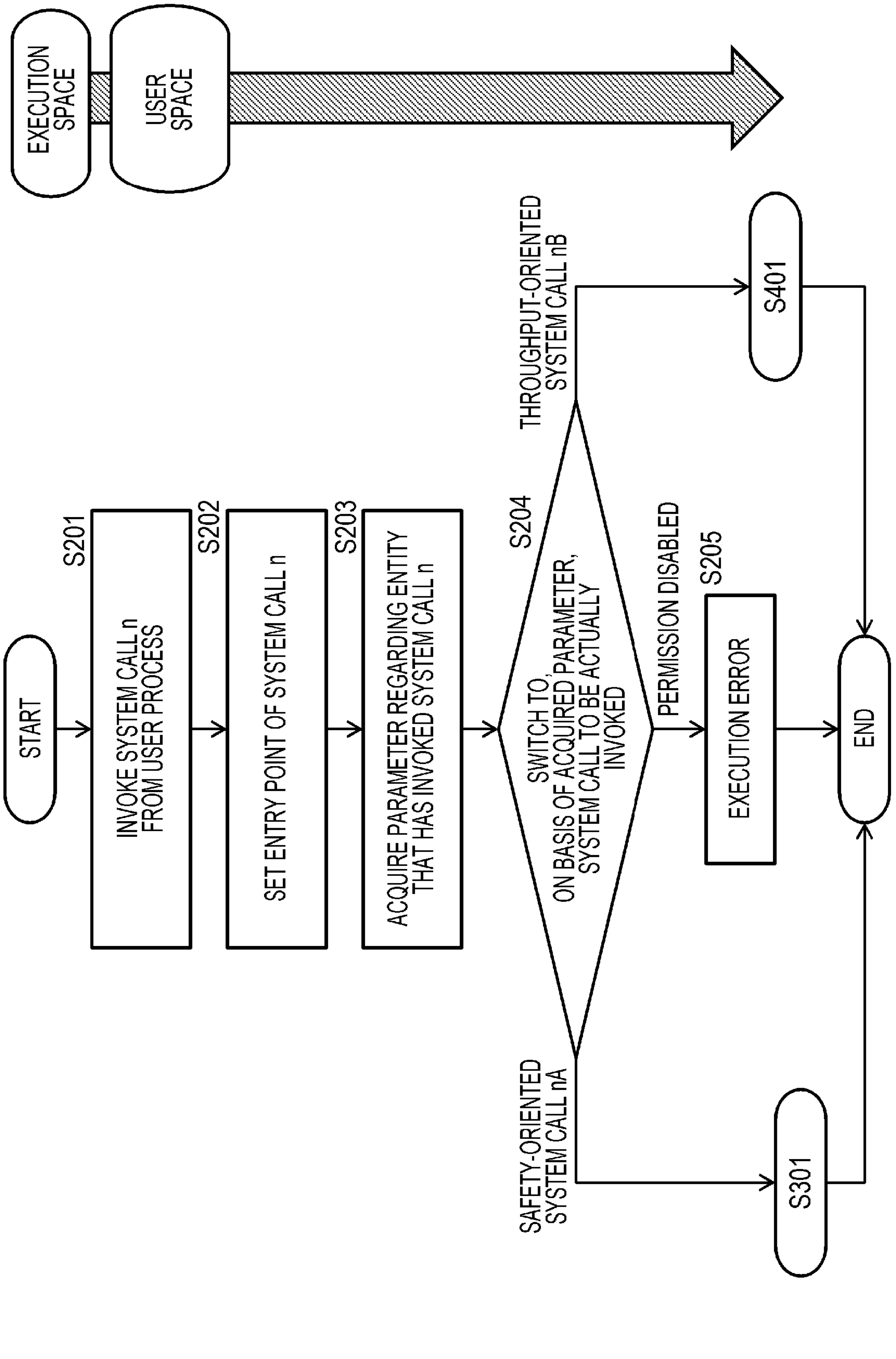
FIG. 8 is a diagram illustrating a flowchart for describing a processing sequence that is executed by the information processing device of the present disclosure.

Processing according to the flowcharts illustrated in FIG. 8 and the subsequent drawings is executed by the data processor of the information processing device 100 in accordance with the program stored in the storage unit. Specifically, the data processor mainly corresponds to the OS (kernel) layer illustrated in FIGS. 5A, 5B, and 5C. Hardware that executes processing mainly corresponds to the CPU of the HW layer.

Note that, in the flowcharts illustrated in FIG. 8 and the subsequent drawings, an execution space of the OS (kernel) layer when processing of each step is executed is also illustrated in parallel with each step of the flow. Specifically, whether the processing of each step in the flow is processing in a user space where user-level processing that is normal application processing is executed or processing that is executed in a privilege-level kernel space is illustrated.

First, processing of each step of the flow illustrated in FIG. 8 will be sequentially described.

(Step S201)

First, in step S201, an application (program) that executes processing in the application layer execute the system call invocation with a system call n (n=one of 1 to N) that is one of the system call numbers designated.

This system call invocation is executed using, for example, an interrupt processing or a dedicated instruction.

(Step S202)

Next, in step S202, the OS (kernel) inputs the system call with the system call number n designated by the application (program) and executes processing of preparing the start of a virtual system call n. For example, processing of setting an entry point of the virtual system call n or the like is executed.

Note that, in a case where the system call number n is designated, a system call that is likely to be executed includes a system call nA and a system call nB. That is, the following two systems calls:

(a) safety-oriented system call nA (vector table nA); and (b) throughput-oriented system call nB (vector table nB), are included as the system call that is likely to be executed.

The system call including such two system calls is referred to as the virtual system call n.

At this stage, the determination of which of the system call nA and the system call nB is executed has yet to be made.

(Step S203)

Next, in step S203, the OS (kernel) acquires parameters such as the application program that has invoked the system call n and the condition of the system (information processing device).

Such parameters correspond to the determination parameters described above with reference to FIG. 7. That is, the parameters correspond to parameters such as the application program and the condition of the system (information processing device) to be referred to when the OS (kernel) determines which of the safety-oriented system call A (vector table A) and the throughput-oriented system call B (vector table B) is executed.

The OS (kernel) acquires the following parameters as described above with reference to FIG. 7.

(1) User permission at the time of program execution (2) Program storage location (3) Program signature code (4) Domain name or IP address of communication destination in a case of program that carries out network communications (5) File access path (6) Resource (CPU, memory, disk I/O, or the like) used by process or process group (7) System state (8) Cumulative number of times of execution of program (9) Program execution timing (Step S204)

Next, in step S204, the OS (kernel) confirms, on the basis of the parameters acquired in step S203, whether permission to execute the system call is enabled, and further determines, in a case where it has been confirmed that the execute permission is enabled, which of the followings (a), (b) is executed:

(a) safety-oriented system call A (vector table A); and (b) throughput-oriented system call B (vector table B).

As described above, the system call is executed by a high privilege-level code in the kernel, so that permission to execute the system call is confirmed before the start of processing.

Note that the processing of confirming permission to execute the system call executed in this step corresponds to processing of confirming permission to execute the virtual system call n including the system call nA and the system call nB as a system call that is likely to be executed.

In a case where it is determined that the permission to execute the virtual system call n is disabled, the processing proceeds to step S205.

Only in a case where it has been confirmed that the permission to execute the system call is enabled, the OS (kernel) determines which of the followings (a), (b) is executed:

(a) the execution of the safety-oriented system call nA (vector table nA); and (b) the execution of the throughput-oriented system call nB (vector table nB).

This determination processing is executed on the basis of the parameters acquired in step S203.

The details of the determination processing are as described above with reference to FIG. 7.

In a case where the OS (kernel) determines "(a) the execution of the safety-oriented system call nA (vector table nA)" on the basis of the parameters acquired in step S203, the processing proceeds to step S301.

On the other hand, in a case where the OS (kernel) determines "(b) the execution of the throughput-oriented system call nB (vector table nB)" on the basis of the parameters acquired in step S203, the processing proceeds to step S401.

(Step S205)

In a case where the OS (kernel) determines in step S204 that the permission to execute the system call is disabled, the processing proceeds to step S205.

In this case, the processing is terminated as an execution error. That is, neither the system call nA nor the system call nB is executed.

Next, processing in a case where the OS (kernel) determines in step S204 "(a) the execution of the safety-oriented system call nA (vector table nA)" on the basis of the parameters acquired in step S203, that is, processing in and after step S301, will be described with reference to the flowchart illustrated in FIG. 9.

Figure 9:
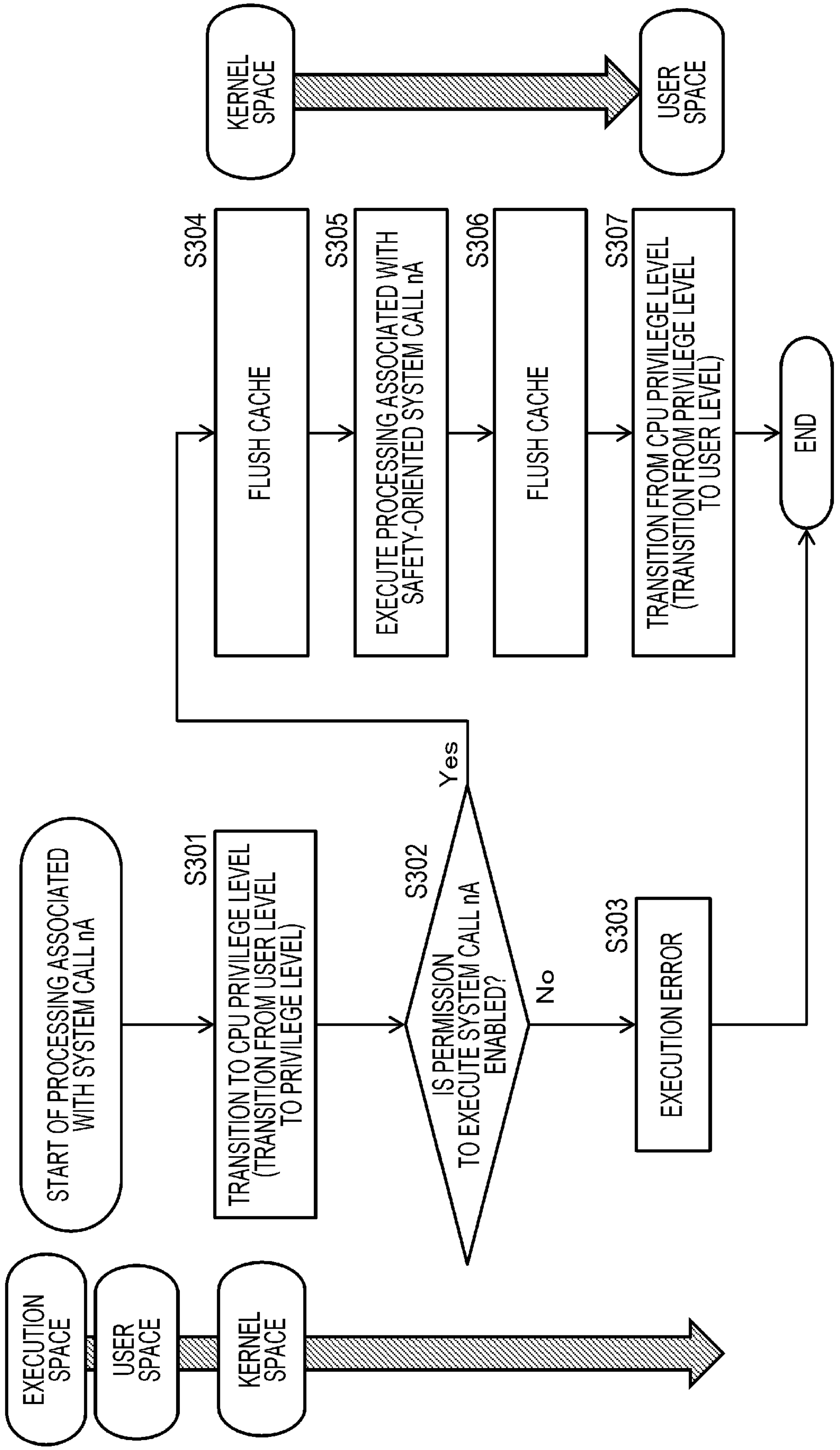
FIG. 9 is a diagram illustrating a flowchart for describing the processing sequence that is executed by the information processing device of the present disclosure.

The flowchart illustrated in FIG. 9 corresponds to a processing sequence of:

(a) the execution of the safety-oriented system call nA (vector table nA).

This processing sequence is basically similar to the processing sequence described above with reference to FIG. 3.

That is, the cache flush processing is executed before and after the step of the processing of confirming permission to execute the system call or the step of executing processing in accordance with the system call.

Hereinafter, processing of each step of the flowchart illustrated in FIG. 9 will be sequentially described.

(Step S301)

First, in step S301, the OS (kernel) executes processing of transitioning to the CPU privilege level. As described above, the CPU transitions, in response to the system call invocation processing, from the user level at which normal data processing by the application is executed to the privilege level at which resource control by the OS (kernel) is executed.

(Step S302)

Next, in step S302, the OS (kernel) confirms permission to execute the system call nA.

As described above, since processing in accordance with the system call, that is, processing such as access to hardware, is executed by a high privilege-level code in the kernel, so that the confirmation of permission to execute the system call and the check of an argument parameter are strictly made before the start of the processing.

In a case where it is determined that the permission to execute the system call nA is disabled, or the argument parameter is an invalid value on the basis of a result of the check, the determination in step S302 indicates No, and the processing proceeds to step S303.

On the other hand, in the processing of confirming execute permission in step S302, in a case where it is determined that the permission to execute the system call nA is enabled, and the argument parameter is a correct value, the determination in step S302 indicates Yes, and the processing proceeds to step S304.

(Step S303)

In the confirmation of permission to execute the system call nA, and the check of an argument parameter in step S302, in a case where it is determined that the execute permission is disabled, or the argument parameter is an invalid value, the determination in step S302 indicates No, and the processing proceeds to step S303.

In this case, step S303 results in an execution error. That is, the processing in accordance with the system call nA is not executed, and the processing is terminated.

(Step S304)

On the other hand, in the confirmation of permission to execute the system call nA and the check of an argument parameter in step S302, in a case where it is determined that the execute permission is enabled, and the argument parameter is a correct value, the determination in step S302 indicates Yes, and the processing proceeds to step S304.

In this case, in step S304, the cache is flushed first. That is, the cache flush processing of erasing data left in the cache memory, the cache memory being used for the processing in accordance with the system call nA, such as file open processing, file read processing, or file write processing, is executed.

(Step S305)

Next, the processing in accordance with the system call nA, that is, the safety-oriented system call nA, is executed using the cache after being subjected to the cache flush processing. For example, file open processing, file read processing, or file write processing is executed.

(Step S306)

When the processing in accordance with the system call, such as file open processing, file read processing, or file write processing, is completed in step S305, the cache flush processing is executed again in step S306 on the cache used for the processing.

This processing erases data recorded in the cache, and it is therefore possible to prevent unauthorized processing such as reading of data from the cache by another subsequent process or data leakage.

(Step S307)

Finally, in step S307, processing of transitioning from the CPU privilege level to the user level is executed. This level transition causes a transition to the user level at which normal data processing is executed by the application.

In the processing according to the flow illustrated in FIG. 9, the cache flush processing executed in step S304 and step S306 corresponds to processing for preventing data loaded into the cache from being read in an unauthorized manner by and leaked to another process that is executed before or after the processing.

That is, as processing for preventing confidential data from being read in an unauthorized manner using the representative techniques of unauthorized access to confidential data in an inaccessible area described above, that is, (1) Code name=Spectre, and (2) Code name=Meltdown, the cache flush processing executed in step S304 and step S306 of the flow illustrated in FIG. 9 is effective.

The execution of such cache flush processing, however, gives rise to a problem of a decrease in processing throughput.

Next, processing in a case where the OS (kernel) determines in step S204 of the flowchart illustrated in FIG. 8 "(b) the execution of the throughput-oriented system call nB (vector table nB)" on the basis of the parameters acquired in step S203, that is, processing in and after step S401, will be described with reference to the flowchart illustrated in FIG. 10.

Figure 10:
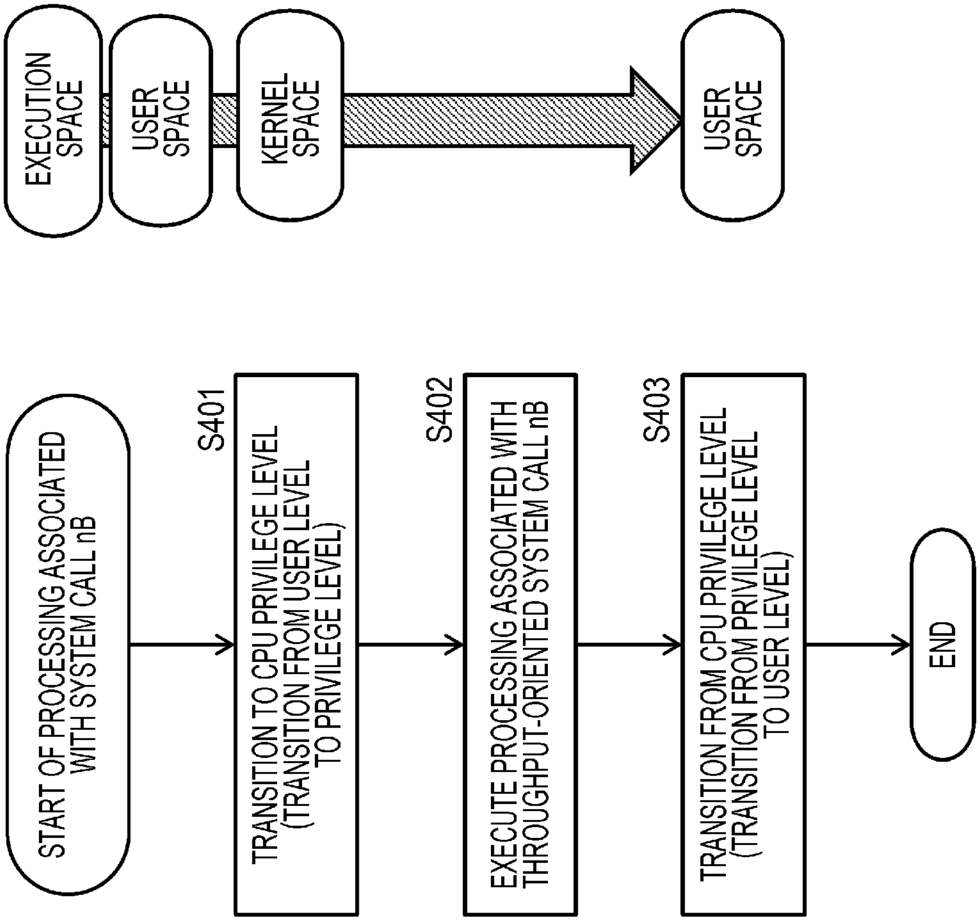
FIG. 10 is a diagram illustrating a flowchart for describing the processing sequence that is executed by the information processing device of the present disclosure.

The flowchart illustrated in FIG. 10 corresponds to a processing sequence of (b) the execution of the throughput-oriented system call nB (vector table nB).

Basically, this processing sequence is largely different from the processing sequence described above with reference to FIG. 3.

That is, the step of the processing of confirming permission to execute the system call and the cache flush processing before and after the step of executing processing in accordance with the system call are skipped.

When processing is skipped as described above, data processing associated with the system call completes quickly. That is, processing throughput increases.

Hereinafter, processing of each step of the flowchart illustrated in FIG. 10 will be sequentially described.

(Step S401)

First, in step S401, the OS (kernel) executes processing of transitioning to the CPU privilege level. As described above, the CPU transitions, in response to the system call invocation processing, from the user level at which normal data processing by the application is executed to the privilege level at which resource control by the OS (kernel) is executed.

(Step S402)

Next, processing in accordance with the system call nB, that is, the throughput-oriented system call nB is executed. For example, file open processing, file read processing, or file write processing is executed.

(Step S403)

Finally, in step S403, processing of transitioning from the CPU privilege level to the user level is executed. This level transition causes a transition to the user level at which normal data processing is executed by the application.

The processing of executing the throughput-oriented system call nB according to the flow illustrated in FIG. 10 is different from the processing of the safety-oriented system call nA described above with reference to FIG. 9 in that neither the processing of confirming permission to execute the system call nB nor the cache flush processing before and after the processing in step S402 that is the step of executing the system call nB is executed.

Therefore, data processing associated with the system call completes quickly, and processing throughput increases accordingly.

Note that the example illustrated in FIG. 10 corresponds to a sequence of the processing of executing the throughput-oriented system call nB in which neither the processing of confirming permission to execute the system call nB nor the cache flush processing before and after the processing of step S402 that is the step of executing the system call nB is executed, but the sequence can be executed as a different processing sequence.

Figure 11:
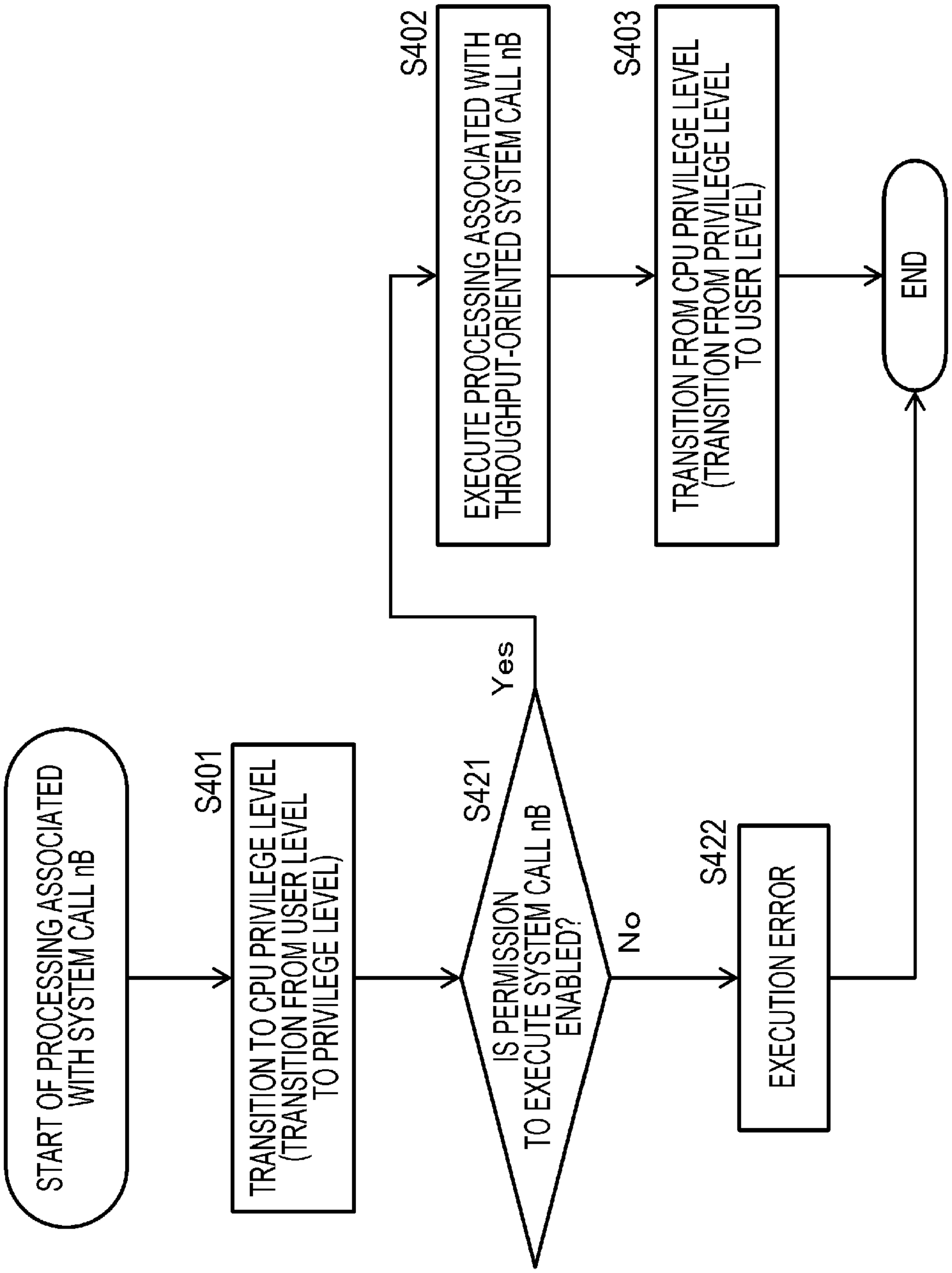
FIG. 11 is a diagram illustrating a flowchart for describing the processing sequence that is executed by the information processing device of the present disclosure.

For example, the flow illustrated in FIG. 11 is a flow obtained by adding step S421 and step S422 to the flow illustrated in FIG. 10.

That is, it is a sequence in which the processing of conforming permission to execute the system call nB is executed, and only the cache flush processing before and after the processing of step S402 that is the step of executing the system call nB is skipped.

Execution of such a processing sequence may be set enabled.

Figure 12:
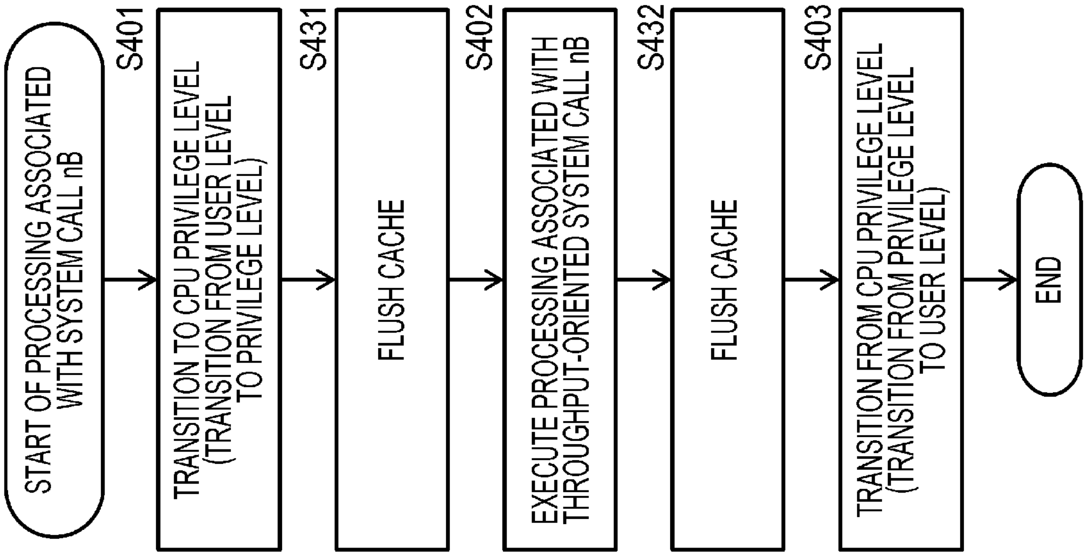
FIG. 12 is a diagram illustrating a flowchart for describing the processing sequence that is executed by the information processing device of the present disclosure.

Furthermore, the flow illustrated in FIG. 12 is a flow obtained by adding step S431 and step S432 to the flow illustrated in FIG. 10.

That is, it is a sequence in which the processing of confirming permission to execute the system call nB is skipped, and the cache flush processing before and after the processing of step S402 that is the step of executing the system call nB is executed.

Execution of such a processing sequence may be set enabled.

Figure 13:
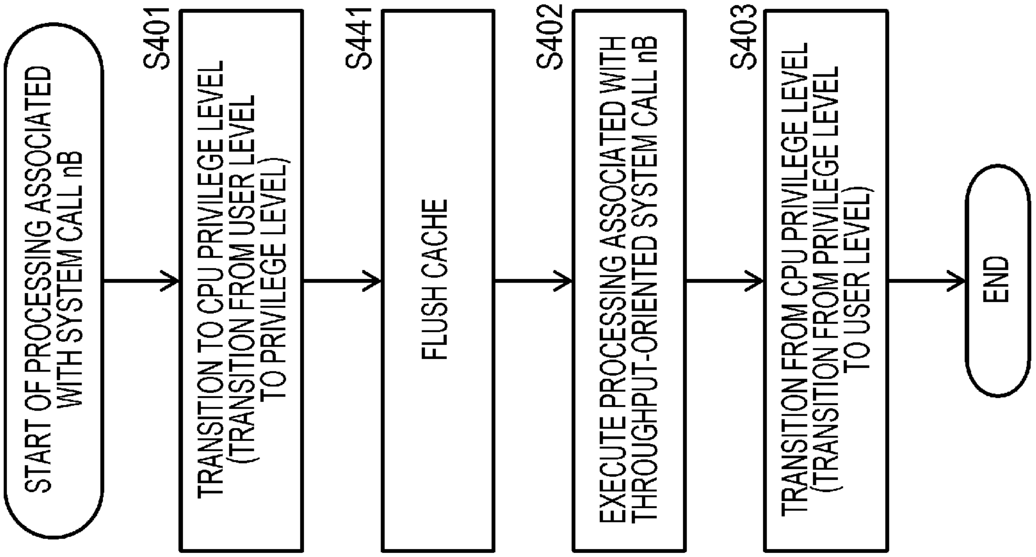
FIG. 13 is a diagram illustrating a flowchart for describing the processing sequence that is executed by the information processing device of the present disclosure.

Furthermore, the flow illustrated in FIG. 13 is a flow obtained by adding step S441 to the flow illustrated in FIG. 10.

That is, it is a sequence in which the processing of confirming permission to execute the system call nB and the cache flush processing after the processing of step S402 that is the step of executing the system call nB are skipped, and only the cache flush processing before the processing of step S402 that is the step of executing the system call nB is executed.

Execution of such a processing sequence may be set enabled.

Figure 14:
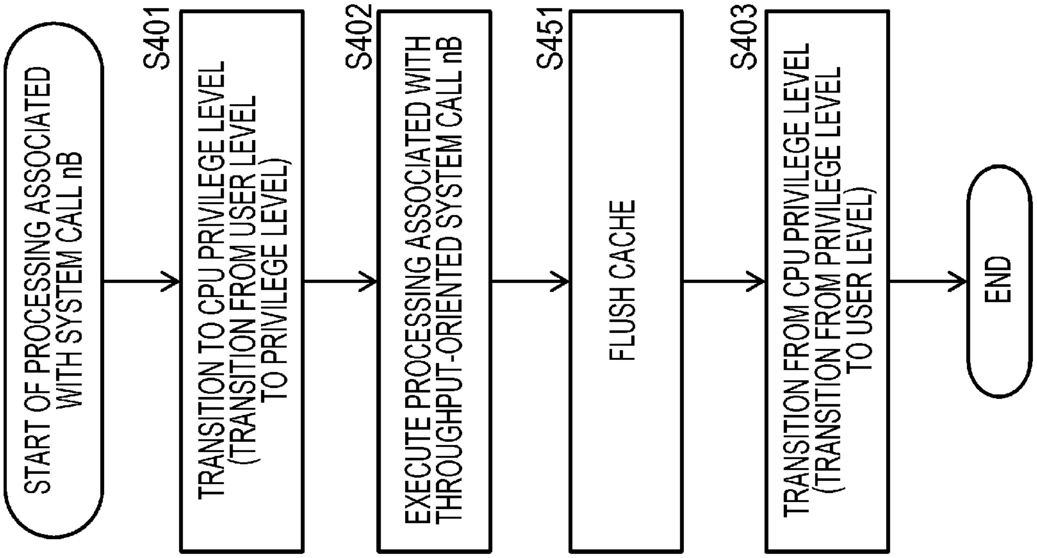
FIG. 14 is a diagram illustrating a flowchart for describing the processing sequence that is executed by the information processing device of the present disclosure.

Furthermore, the flow illustrated in FIG. 14 is a flow obtained by adding step S451 to the flow illustrated in FIG. 10.

That is, it is a sequence in which the processing of confirming permission to execute the system call nB and the cache flush processing before the processing of step S402 that is the step of executing the system call nB are skipped, and only the cache flush processing after the processing of step S402 that is the step of executing the system call nB is executed.

Execution of such a processing sequence may be set enabled.

Furthermore, in the above-described embodiment, a description has been given of the configuration where the following two types of system calls:

(a) the safety-oriented system call A (vector table A); and (b) the throughput-oriented system call B (vector table B), are set and selectively executed.

Moreover, for example, a configuration may be employed where three or more types of system calls (vector tables) is associated with one system call number n (n=1 to N), and a system call to be executed is selected from among the three or more types of system calls and executed.

For example, six types of system calls A, B, C, D, E, F are set for a system call n associated with one system call number n. That is, the following six types of system calls:

A system Call nA;

A system Call nB;

A system Call nC;

A system Call nD;

A system call nE; and

A system Call nF, are associated with the one system call number n.

The OS (kernel) selects and executes any one of the six system calls.

For example, in a case where the system call nA is selected, the processing according to the flow illustrated in FIG. 9 is executed.

In a case where the system call nB is selected, the processing according to the flow illustrated in FIG. 10 is executed.

In a case where the system call nC is selected, the processing according to the flow illustrated in FIG. 11 is executed.

In a case where the system call nD is selected, the processing according to the flow illustrated in FIG. 12 is executed.

In a case where the system call nE is selected, the processing according to the flow illustrated in FIG. 13 is executed.

In a case where the system call nF is selected, the processing according to the flow illustrated in FIG. 14 is executed.

For example, a configuration where such processing is executed may be employed.

6. OTHER EMBODIMENTS AND APPLICATION EXAMPLES

Next, other embodiments and application examples will be described.

In the above-described embodiment, a description has been given of a configuration where, for one system call number n, the following two types of system calls (a), (b) are set:

(a) the safety-oriented system call nA (vector table nA); and (b) the throughput-oriented system call nB (vector table nB), and the OS (kernel) selectively executes one of the system calls on the basis of the reliability of the application program that executes the system call invocation, the reliability and confidentiality of data used for processing, the condition of the system (information processing device), or the like.

For example, in a case where the reliability of the application program that executes the system call invocation or the reliability of data used for processing is low, or in a case where the confidentiality of data used for processing is high, "(a) safety-oriented system call A (vector table A)" is selected and executed.

On the other hand, in a case where the reliability of the application program that executes the system call invocation or the reliability of data used for processing is high, or in a case where the confidentiality of data used for processing is low, "(b) the throughput-oriented system call B (vector table B)" is selected and executed.

As described above, in a case where the "(b) the throughput-oriented system call B (vector table B)" is executed, high-speed processing becomes possible, and processing efficiency can be increased accordingly.

As described above, in the above-described embodiment, a description has been given of a configuration where the OS (kernel) selects and executes one of two or three or more system calls on the basis of the reliability of the application program that executes the system call invocation, the reliability and confidentiality of data used for processing, the condition of the system (information processing device), or the like.

In addition, for example, the reliability of the program or data is ranked on a scale of levels 1 to 100, and the level 1 indicates the highest reliability, and the level 100 indicates the lowest reliability. A configuration where processing of gradually changing the strictness of the system call check on the basis of the reliability is executed may be employed.

Moreover, in a case where there is a possibility that the load on the system (information processing device) becomes high, and the computing power becomes insufficient accordingly, even in a program with low reliability, the system call check is temporarily made less strict to minimize a decrease in computation throughput, thereby maintaining the overall processing throughput. In a case where the load on the system returns to the original load, processing of causing the system call to return to the original strict level may be executed.

Furthermore, in a case where the load on the system increases, and an increase in temperature of the CPU is detected, the system call check is temporarily made less strict so as to lower the CPU load to suppress an increase in temperature. In a case where the temperature of the CPU returns to the original temperature, processing of causing the system call to return to the original strict level may be executed.

Moreover, in a case where a tendency of the system to decrease in battery capacity or the system to suffer a power shortage is detected, the system call check is temporarily made less strict so as to reduce power consumption to prevent a power shortage. In a case where the battery capacity is recovered, or the power shortage is eliminated, processing of causing the system call to return to the original strict level may be executed.

7. CONFIGURATION EXAMPLE OF INFORMATION PROCESSING DEVICE

Next, a hardware configuration example of the information processing device that executes processing according to the above-described embodiments will be described with reference to FIG. 15.

Figure 15:
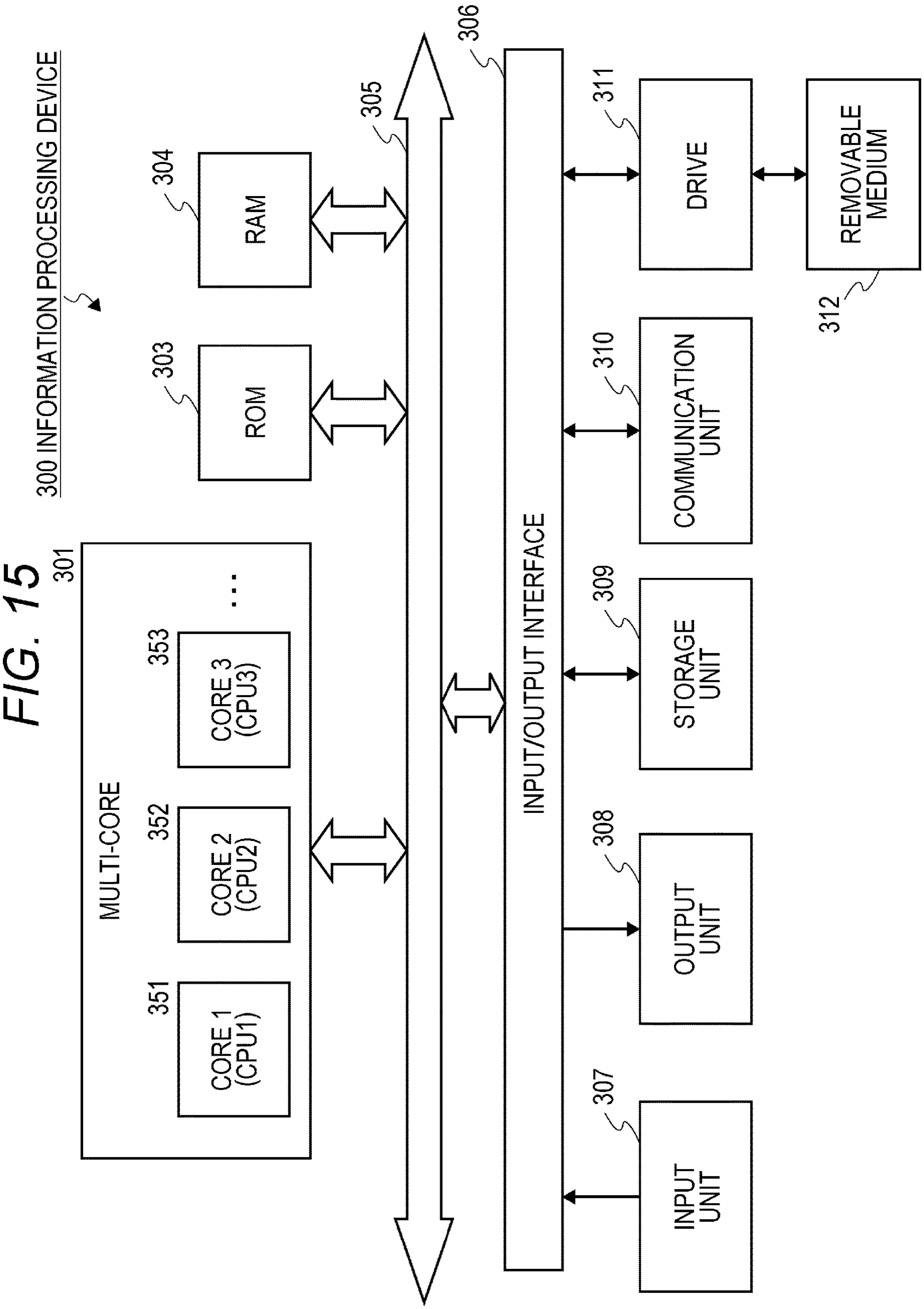
FIG. 15 is a diagram illustrating a hardware configuration example of the information processing device.

Hereinafter, an information processing device 300 illustrated in FIG. 15 is an information processing device corresponding to an example of an overall configuration of the information processing device 100 illustrated in FIG. 4 described in the above-described embodiment. Each component constituting the information processing device 300 will be described.

A Multi-core 301 includes a plurality of cores (central processing units (CPUs)). As illustrated in FIG. 11, the multi-core 301 includes at least two cores such as a core 1 (CPU 1) 351, a core 2 (CPU 2) 352, and a core 3 (CPU 3) 353.

On the plurality of cores (CPU), for example, various types of processing in accordance with a program stored in a read only memory (ROM) 303 or a storage unit 309 are executed.

The read only memory (ROM) 303 is used as a storage area of a program that is executed by the multi-core 301 or a GPU 302, a parameter, and the like.

A random access memory (RAM) 304 is used as a work area, a parameter storage area, a recording area of other data, and the like for processing that is executed by the multi-core 301 or the GPU 302.

The multi-core 301, the GPU 302, the ROM 303, and the RAM 304 are mutually connected over a bus 305.

The multi-core 301, the GPU 302, and the like are connected to an input/output interface 306 over the bus 305, and an input unit 307 including various switches, a keyboard, a touchscreen, a mouse, and a microphone and further including a data acquisition unit such as a sensor and a camera, and the like, and an output unit 309 including a display such as a monitor, a speaker, and the like are connected to the input/output interface 306.

The multi-core 301 receives a command, condition data, and the like input from the input unit 307, executes various types of processing, and outputs a processing result to, for example, the output unit 308.

The storage unit 309 connected to the input/output interface 306 includes, for example, a hard disk or the like, and stores a program to be executed by the multi-core 301 and various types of data. A communication unit 310 serves as a transmitter/receiver of data communications over a network such as the Internet or a local area network, and communicates with an external device.

A drive 311 connected to the input/output interface 306 drives a removable medium 312 such as a magnetic disk, an optical disc, a magneto-optical disk, or a semiconductor memory such as a memory card to write or read data.

8. SUMMARY OF CONFIGURATION OF PRESENT DISCLOSURE

The embodiment of the present disclosure has been described above in detail with reference to specific embodiments. It is obvious, however, that those skilled in the art can make modifications to or substitutions of the embodiment without departing from the gist of the present disclosure. That is, the present invention has been disclosed in an illustrative form, and should not be interpreted in a limited manner. In order to determine the gist of the present disclosure, the claims should be taken into consideration.

Note that the technology disclosed herein may have the following configurations.

(1) An information processing device including a data processor configured to carry out system call execution control in response to system call invocation that is a request to execute hardware application processing from an application, in which the data processor selects and executes one of a plurality of system calls associated with one system call number designated with the system call invocation.

(2) The information processing device according to (1), in which the plurality of system calls associated with one system call number includes at least two types of system calls:

a system call A that executes safety-oriented data processing; and a system call B that executes throughput-oriented data processing.

(3) The information processing device according to (2), in which the system call A that executes the safety-oriented data processing includes a processing sequence in which processing of confirming permission to execute a system call and cache memory flush processing before and after system call-associated processing are executed, and the system call B that executes the throughput-oriented data processing includes a processing sequence in which at least one of the processing of confirming permission to execute a system call or the cache memory flush processing before and after the system call-associated processing is skipped.

(4) The information processing device according to any one of (1) to (3), in which the data processor is configured to select a system call to be executed in accordance with reliability of the application, and the data processor executes a system call A that executes safety-oriented data processing in a case where the reliability of the application is determined to be low and executes a system call B that executes throughput-oriented data processing in a case where the reliability of the application is determined to be high.

(5) The information processing device according to any one of (1) to (4), in which the data processor selects a system call to be executed in accordance with at least one of reliability of data to be used at a time of system call execution or confidentiality of the data.

(6) The information processing device according to any one of (1) to (5), in which the data processor is configured to select a system call to be executed in accordance with reliability of data to be used at the time of system call execution or confidentiality of the data, and the data processor executes a system call A that executes safety-oriented data processing in a case where the reliability of the data to be used at the time of system call execution is determined to be low, or in a case where the confidentiality of the data to be used at the time of system call execution is determined to be high and executes a system call B that executes throughput-oriented data processing in a case where the reliability of the data to be used at the time of system call execution is determined to be high, or in a case where the confidentiality of the data to be used at the time of system call execution is determined to be low.

(7) The information processing device according to any one of (1) to (6), in which the data processor selects a system call to be executed in accordance with reliability of a communication partner with which communications are carried out at the time of system call execution.

(8) The information processing device according to any one of (1) to (7), in which the data processor selects a system call to be executed in accordance with reliability of an access path to be used at the time of system call execution.

(9) The information processing device according to any one of (1) to (8), in which the data processor selects a system call to be executed in accordance with a cumulative number of times of execution of the application program.

(10) The information processing device according to any one of (1) to (9), in which the data processor selects a system call to be executed in accordance with a condition of the information processing device.

(11) The information processing device according to any one of (1) to (10), in which the data processor selects a system call to be executed in accordance with at least one of conditions of the information processing device including a processing load on a CPU of the information processing device at the time of system call execution, a temperature of the information processing device, and a remaining battery capacity of the information processing device.

(12) The information processing device according to any one of (1) to (11), in which each of the plurality of system calls associated with the one system call number is associated with an individual vector table storing an individual unique instruction address.

(13) An information processing method that is executed by an information processing device, the information processing device including a data processor configured to carry out system call execution control in response to system call invocation that is a request to execute hardware application processing from an application, the information processing method including causing the data processor to select and execute one of a plurality of system calls associated with one system call number designated with the system call invocation.

(14) A program for causing an information processing device to execute information processing, the information processing device including a data processor configured to carry out system call execution control in response to system call invocation that is a request to execute hardware application processing from an application, the program including causing the data processor to select and execute one of a plurality of system calls associated with one system call number designated with the system call invocation.

The series of processing described herein may be executed by hardware, software, or a combination of hardware and software. In a case where processing is executed by software, a program recording a processing sequence can be installed on a memory in a computer incorporated in dedicated hardware and executed, or the program can be installed on a general-purpose computer capable of executing various types of processing and executed. For example, the program can be recorded in advance on a recording medium. In addition to installation from the recording medium onto the computer, the program can be received over a network such as a local area network (LAN) or the Internet and installed on a recording medium such as a built-in hard disk.

Note that the various types of processing described herein may be executed not only in time series according to the description but also in parallel or individually in a manner that depends on the throughput of the device that executes processing or as necessary. Furthermore, herein, the system refers to a configuration of a logical set of a plurality of devices, and is not limited to a system in which devices as components are in the same housing.

INDUSTRIAL APPLICABILITY

As described above, according to the configuration of the embodiment of the present disclosure, an information processing device and an information processing method that execute system call processing with improved processing efficiency without compromising security level are provided.

Specifically, for example, a kernel as a data processor that carries out system call execution control determines the reliability of an application that executes the system call invocation and the reliability of processing data, and selects and executes either a safety-oriented system call A or a throughput-oriented system call B in accordance with a result of the determination. With the safety-oriented system call A, confirmation of permission to execute the system call and cache flush are executed, but with the throughput-oriented system call B, neither the confirmation of permission to execute the system call nor the cache flush is executed.

According to this configuration, an information processing device and an information processing method that execute system call processing with improved processing efficiency without compromising security level are provided.

REFERENCE SIGNS LIST

100 Information processing device
101 Multi-core CPU
102 RAM
103 ROM
104 Storage unit
105 Bus
300 Information processing device
301 Multi-core
303 ROM
304 RAM
305 Bus
306 Input/output interface
307 Input unit
308 Output unit
309 Storage unit
310 Communication unit
311 Drive
312 Removable medium
351 to 353 Core (CPU)

The invention claimed is:

1. An information processing device, comprising:
a data processor configured to:
control system call execution for an application based on system call invocation from the application, wherein
the system call invocation is associated with a specific system call number, and
the specific system call number is associated with a plurality of system calls;
select a system call among the plurality of system calls based on the control of the system call execution and at least one of:
reliability of data used at a time of the system call execution, or
confidentiality of the data, wherein
the plurality of system calls is associated with a same hardware application process of the application,
the plurality of system calls includes:
a system call A that executes a safety-oriented data process; and
a system call B that executes a throughput-oriented data process, and
the system call A is selected as the system call in a case where at least one of:
the reliability of the data is lower than a specific level, or
the confidentiality of the data is higher than the specific level; and
execute the same hardware application process of the application based on the selected system call.

2. The information processing device according to claim 1, wherein, in a case where the system call A is selected as the system call, the data processor is further configured to:
determine whether a permission to execute the system call A is enabled; and
execute a cache memory flush process before and after the execution of the same hardware application process.

3. The information processing device according to claim 1, wherein
the data processor is further configured to select the system call among the plurality of system calls based on reliability of the application, and
the system call A is selected as the system call in a case where the reliability of the application is lower than the specific level.

4. The information processing device according to claim 1, wherein the data processor is further configured to:
control communication with a communication partner at the time of the system call execution; and
select the system call based on reliability of the communication partner.

5. The information processing device according to claim 1, wherein the data processor is further configured to select the system call based on reliability of an access path used at the time of the system call execution.

6. The information processing device according to claim 1, wherein the data processor is further configured to select the system call based on a cumulative number of times of execution of the application.

7. The information processing device according to claim 1, wherein the data processor is further configured to select the system call based on a condition of the information processing device.

8. The information processing device according to claim 1, wherein the data processor is further configured to select the system call based on at least one condition of conditions of the information processing device, and the conditions of the information processing device include:

a processing load on a central processing unit (CPU) of the information processing device at the time of the system call execution, a temperature of the information processing device, and a remaining battery capacity of the information processing device.

9. The information processing device according to claim 1, wherein the specific system call number is associated with a plurality of vector tables, each system call of the plurality of system calls is associated with a respective vector table of the plurality of vector tables, and each vector table of the plurality of vector tables stores a unique instruction address for a corresponding system call of the plurality of system calls.

10. An information processing method, comprising:

in an information processing device including a data processor:

controlling system call execution for an application based on system call invocation from the application, wherein the system call invocation is associated with a specific system call number, and the specific system call number is associated with a plurality of system calls;

selecting a system call among the plurality of system calls based on the control of the system call execution and at least one of:

reliability of data used at a time of the system call execution, or confidentiality of the data, wherein the plurality of system calls is associated with a same hardware application process of the application, the plurality of system calls includes:

a system call A that executes a safety-oriented data process; and a system call B that executes a throughput-oriented data process, and the system call A is selected as the system call in a case where at least one of:

the reliability of the data is lower than a specific level, or the confidentiality of the data is higher than the specific level; and executing the same hardware application process of the application based on the selected system call.

11. A non-transitory computer-readable medium, having stored thereon, computer-executable instructions that, when executed by a data processor, cause the data processor to execute operations, the operations comprising:

controlling system call execution for an application based on system call invocation from the application, wherein the system call invocation is associated with a specific system call number, and the specific system call number is associated with a plurality of system calls;

selecting a system call among the plurality of system calls based on the control of the system call execution and at least one of:

reliability of data used at a time of the system call execution, or confidentiality of the data, wherein the plurality of system calls is associated with a same hardware application process of the application, the plurality of system calls includes:

a system call A that executes a safety-oriented data process; and a system call B that executes a throughput-oriented data process, and the system call A is selected as the system call in a case where at least one of:

the reliability of the data is lower than a specific level, or the confidentiality of the data is higher than the specific level; and executing the same hardware application process of the application based on the selected system call.

12. The information processing device according to claim 1, wherein, in a case where the system call B is selected as the system call, the data processor is further configured to prohibit at least one of:

determination of whether a permission to execute the system call B is enabled; or execution of a cache memory flush process before and after the execution of the same hardware application process.

13. The information processing device according to claim 1, wherein the data processor is further configured to select the system call among the plurality of system calls based on reliability of the application, and the system call B is selected as the system call, in a case where the reliability of the application is higher than the specific level.

14. The information processing device according to claim 1, wherein the system call B is selected as the system call in a case where at least one of:

the reliability of the data is higher than the specific level, or the confidentiality of the data is lower than the specific level.

* * * * *